United States Patent
Uemichi

(10) Patent No.: US 9,831,897 B2
(45) Date of Patent: Nov. 28, 2017

(54) DIRECTIONAL COUPLER AND DIPLEXER

(71) Applicant: FUJIKURA LTD., Tokyo (JP)

(72) Inventor: Yusuke Uemichi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 25 days.

(21) Appl. No.: 15/187,987

(22) Filed: Jun. 21, 2016

(65) Prior Publication Data

US 2016/0380330 A1 Dec. 29, 2016

(30) Foreign Application Priority Data

Jun. 24, 2015 (JP) .................................. 2015-126656
Jun. 2, 2016 (JP) .................................. 2016-111193

(51) Int. Cl.
*H01P 5/18* (2006.01)
*H04B 1/00* (2006.01)
*H01P 3/12* (2006.01)
*H04L 5/14* (2006.01)

(52) U.S. Cl.
CPC ........... *H04B 1/0057* (2013.01); *H01P 5/182* (2013.01); *H04L 5/14* (2013.01)

(58) Field of Classification Search
CPC .. H01P 5/18; H01P 5/181; H01P 5/182; H01P 3/12; H01P 3/123
USPC ........................................ 333/109–113, 122
See application file for complete search history.

(56) References Cited

U.S. PATENT DOCUMENTS

| | | | | |
|---|---|---|---|---|
| 2,739,288 A * | 3/1956 | Riblet | ..................... | H01P 5/182 333/113 |
| 3,056,096 A | 9/1962 | Vane | | |
| 3,312,913 A | 4/1967 | Salzberg | | |
| 4,686,493 A * | 8/1987 | Chang | ..................... | H01P 5/182 333/113 |
| 4,812,788 A * | 3/1989 | Wong | ..................... | H01Q 3/40 333/113 |
| 6,882,244 B2 * | 4/2005 | Stenberg | ................. | H01P 1/122 333/109 |
| 7,064,633 B2 * | 6/2006 | Wu | ........................ | H01P 5/082 333/230 |
| 7,821,355 B2 * | 10/2010 | Engel | ..................... | H01P 1/211 333/117 |
| 7,973,616 B2 * | 7/2011 | Shijo | ....................... | H01P 3/121 333/113 |

(Continued)

FOREIGN PATENT DOCUMENTS

JP 2009-296376 A 12/2009

OTHER PUBLICATIONS

K. Murai et al., "Broadband Design Method of SIW 3dB Directional Coupler", Institute of Electronics, Information and Communication Engineers Sougou Taikai Kouen Ronbunshuu, Electronics (1), 2011, pp. 119, C-2-81.

(Continued)

*Primary Examiner* — Dean Takaoka

(74) *Attorney, Agent, or Firm* — Westerman, Hattori, Daniels & Adrian

(57) ABSTRACT

A directional coupler includes rectangular waveguides each including: a pair of protruding sections which are provided on a first narrow wall or a second narrow wall, which are provided symmetrically with respect to an opening, and which protrude from one of the first and second narrow walls toward the other; and other protruding section which protrudes from the second narrow wall toward the opening.

11 Claims, 20 Drawing Sheets

(56) References Cited

U.S. PATENT DOCUMENTS

| | | | |
|---|---|---|---|
| 8,324,983 B2* | 12/2012 | Brandau | ............... H01P 5/182 |
| | | | 333/113 |
| 2009/0303145 A1 | 12/2009 | Shijo et al. | |
| 2016/0380331 A1* | 12/2016 | Uemichi | ............... H01P 5/182 |
| | | | 333/110 |

OTHER PUBLICATIONS

A. Hino et al, "A Design of Broad-Band Compact H-Plane Directional Couplers", Technical Report of the Institute of Electronics, Information and Communication Engineers, vol. 100, No. 528, 2000, pp. 85-92.

Office Action dated Aug. 9, 2016, issued in counterpart Japanese Patent Application No. 2016-111193, with English translation. (14 pages).

Notice of Allowance dated Nov. 8, 2016, issued in counterpart Japanese Patent Application No. 2016-111193, with English translation. (5 pages).

Hao et. al., "Single-layer substrate integrated waveguide directional couplers" Microwaves, Antennas and Propagation, IEE Proceedings, vol. 153, No. 5, Oct. 2006, pp. 426-431.

* cited by examiner

DIRECTIONAL COUPLER AND DIPLEXER

This Nonprovisional application claims priority under 35 U.S.C. §119 on Patent Application No. 2015-126656 filed in Japan on Jun. 24, 2015 and Patent Application No. 2016-111193 filed in Japan on Jun. 2, 2016, the entire contents of which are hereby incorporated by reference.

TECHNICAL FIELD

The present invention relates to a directional coupler including two rectangular waveguides. Furthermore, the present invention relates to a diplexer including such a directional coupler.

BACKGROUND ART

In the technical field dealing with high-frequency signals such as microwaves and millimeter waves, a directional coupler which divides such a high-frequency signal or combines such high-frequency signals is widely used. As an example of such a directional coupler, FIG. 1 of Non-patent Literature 1 illustrates a directional coupler including two post-wall waveguides sharing a waveguide narrow wall having an opening. FIG. 24 is a perspective view schematically illustrating a configuration of a directional coupler 7 disclosed in Non-patent Literature 1. To be precise, a configuration in which narrow walls of the rectangular waveguide illustrated in FIG. 24 are realized as post walls corresponds to the post-wall waveguide disclosed in Non-patent Literature 1.

As illustrated in FIG. 24, the directional coupler 7 includes a first rectangular waveguide 71 and a second rectangular waveguide 72. The first rectangular waveguide 71 and the second rectangular waveguide 72 share a narrow wall 73. The narrow wall 73 has an opening 731, and an inside of the first rectangular waveguide 71 and an inside of the second rectangular waveguide 72 are communicated with each other via the opening 731.

Provision of the opening 731 in the narrow wall 73 enables the first rectangular waveguide 71 and the second rectangular waveguide 72 to be electromagnetically coupled with each other. Accordingly, for example, in a case where a high-frequency signal is caused to enter a first port P1, the high-frequency signal is caused to exit not only from a second port P2 but also from a third port P3 and a fourth port P4. In this case, a ratio of a power of the high-frequency signal caused to exit from the third port P3 to a power of the high-frequency signal caused to enter the first port P1 depends on a strength of coupling between the first rectangular waveguide 71 and the second rectangular waveguide 72. The strength of coupling is referred to as a coupling degree. The coupling degree can be changed by changing a width W of the opening. In a case of a directional coupler having a coupling degree of 3 dB, a ratio of a power of the high-frequency signal caused to exit from the third port P3 to a power of the high-frequency signal caused to exit from the second port P2 is 1:1.

CITATION LIST

Non-Patent Literature

[Non-Patent Literature 1]
Z. C. Hao et. al., Microwaves, Antennas and Propagation, IEE Proceedings, Vol. 153, No. 5, p. 426, October 2006

SUMMARY OF INVENTION

Technical Problem

The inventors of the present application (hereinafter, inventors) determined parameters of the directional coupler 7 of a conventional example as follows so that a target operating frequency in design (hereinafter, target frequency) was 78.5 GHz, i.e. 52.3 GHz which is approximately ⅔ of 78.5 GHz is a cutoff frequency in a $TE_{10}$ mode.

A specific inductive capacity of the inside of the first rectangular waveguide 71 and a specific inductive capacity of the inside of the second rectangular waveguide 72 were each set to 3.823.

A width of the first rectangular waveguide 71 and a width of the second rectangular waveguide 72 were each set to 1.47 mm.

A height of the first rectangular waveguide 71 and a height of the second rectangular waveguide 72 were each set to 0.5 mm.

A thickness of the narrow wall 73 was set to 0.1 mm.

In order that the directional coupler had a coupling degree of approximately 3 dB, the width W of the opening 731 was set to 1.95 mm.

FIG. 25 shows a result of calculating a frequency dependency of S parameters with use of the conventional directional coupler 7 whose parameters were set as above (hereinafter, conventional example). Among S parameters shown in FIG. 25, S(1,1) indicates a ratio of a power of a high-frequency signal reflected from the first port P1 to a power of a high-frequency signal caused to enter the first port P1. Similarly, S(1,2), S(1,3), and S(1,4) indicate respective ratios of powers of high-frequency signals caused to exit from the second port P2, the third port P3, and the fourth port P4 to a power of a high-frequency signal caused to enter the first port P1.

In a frequency band of not less than 65 GHz and not more than 81 GHz, S(1,1) and S(1,4) are each lower than −13 dB, showing that the coupling between the first rectangular waveguide 71 and the second rectangular waveguide 72 realizes an overcoupling characteristic. This indicates that in the frequency band of not less than 65 GHz and not more than 81 GHz, the directional coupler 7 of the conventional example operates as a directional coupler.

On the other hand, it is found that in a frequency band of more than 78.5 GHz which is a target frequency (frequency band of not less than 82 GHz and not more than 90 GHz), S(1,1) and S(1,4) increase. Specifically, at 82 GHz, S(1,1) and S(1,4) reach approximately −10 dB which is higher than −13 dB. In a case where a high-frequency signal is caused to enter the first port P1, emission of a high-frequency signal from the fourth port P4 indicates a decrease in directivity of the directional coupler 7. In a case where a high-frequency signal is caused to enter the first port P1, reflection of a high-frequency signal from the first port P1 indicates breakdown of consistency of the directional coupler 7. As above, it is found that the directional coupler 7 cannot sufficiently cut return losses at 82 GHz.

82 GHz is a frequency corresponding to approximately 105% of 78.5 GHz which is a target frequency. In other words, it is found that although the directional coupler 7 can cut return losses at the target frequency, the directional coupler 7 cannot cut return losses at a frequency corresponding to 105% of the target frequency.

In order to detect the cause, the inventors calculated an electric field strength at a plane parallel to a wide wall of the conventional directional coupler 7. The result of calculation of the electric field strength is shown in FIG. 26. (a) of FIG. 26 and (b) of FIG. 26 are contour views showing electric field strengths in cases where high-frequency signals of 70 GHz and 82 GHz were caused to enter the first port P1, respectively.

Three points are found from (a) of FIG. 26: (1) a high-frequency signal caused to enter the first port P1 was propagated inside the first waveguide 71 and was caused to exit from the second port P2; (2) a high-frequency signal input from the inside of the first waveguide 71 to the inside of the second waveguide 72 via the opening 731 was caused to exit from the third port P3; and (3) a high-frequency signal which was input from the inside of the first waveguide 71 to the inside of the second waveguide 72 via the opening 731 and which was caused to exit from the fourth port P4 had an electric field strength clearly smaller than that of a high-frequency signal caused to exit from the third port P3.

It is found from (b) of FIG. 26 that (1) a state of an electric field strength distributed for the first waveguide 71 and the second waveguide 72 via the opening 731 was off-balanced, and consequently (2) a high-frequency signal caused to enter the first port P1 was caused to exit not only from the second port P2 and the third port P3 but also from the fourth port P4 with a large electric field strength.

As described above, it is found that although the conventional directional coupler 7 can cut return losses in the target frequency, the directional coupler 7 cannot sufficiently cut return losses in a specific frequency band whose lower limit is the target frequency (in this case, a frequency band whose upper limit is 105% of the target frequency).

The present invention was made in view of the foregoing problem. An object of the present invention is to provide a directional coupler which can be used for microwaves and millimeter waves and which has a smaller return loss in a specific frequency band whose lower limit is a target frequency, as compared with a conventional directional coupler.

Solution to Problem

In order to solve the foregoing problem, a directional coupler of the present invention is a directional coupler, comprising a first rectangular waveguide and a second rectangular waveguide, the first rectangular waveguide and the second rectangular waveguide sharing a first narrow wall having an opening, and the first rectangular waveguide and the second rectangular waveguide including respective second narrow walls each facing the first narrow wall, each of the first rectangular waveguide and the second rectangular waveguide further including: a pair of first protruding sections which are provided, symmetrically with respect to the opening, at the first narrow wall or the second narrow wall, so as to (i) be on an incident side of the opening and on an exit side of the opening, respectively, and (ii) protrude from one of the first and second narrow walls toward the other; and a second protruding section which protrudes from the second narrow wall toward the opening.

Advantageous Effects of Invention

The present invention can provide a directional coupler for microwaves and millimeter waves, having a smaller return loss in a specific frequency band whose lower limit is a target frequency, as compared with a conventional directional coupler.

Figure 20:
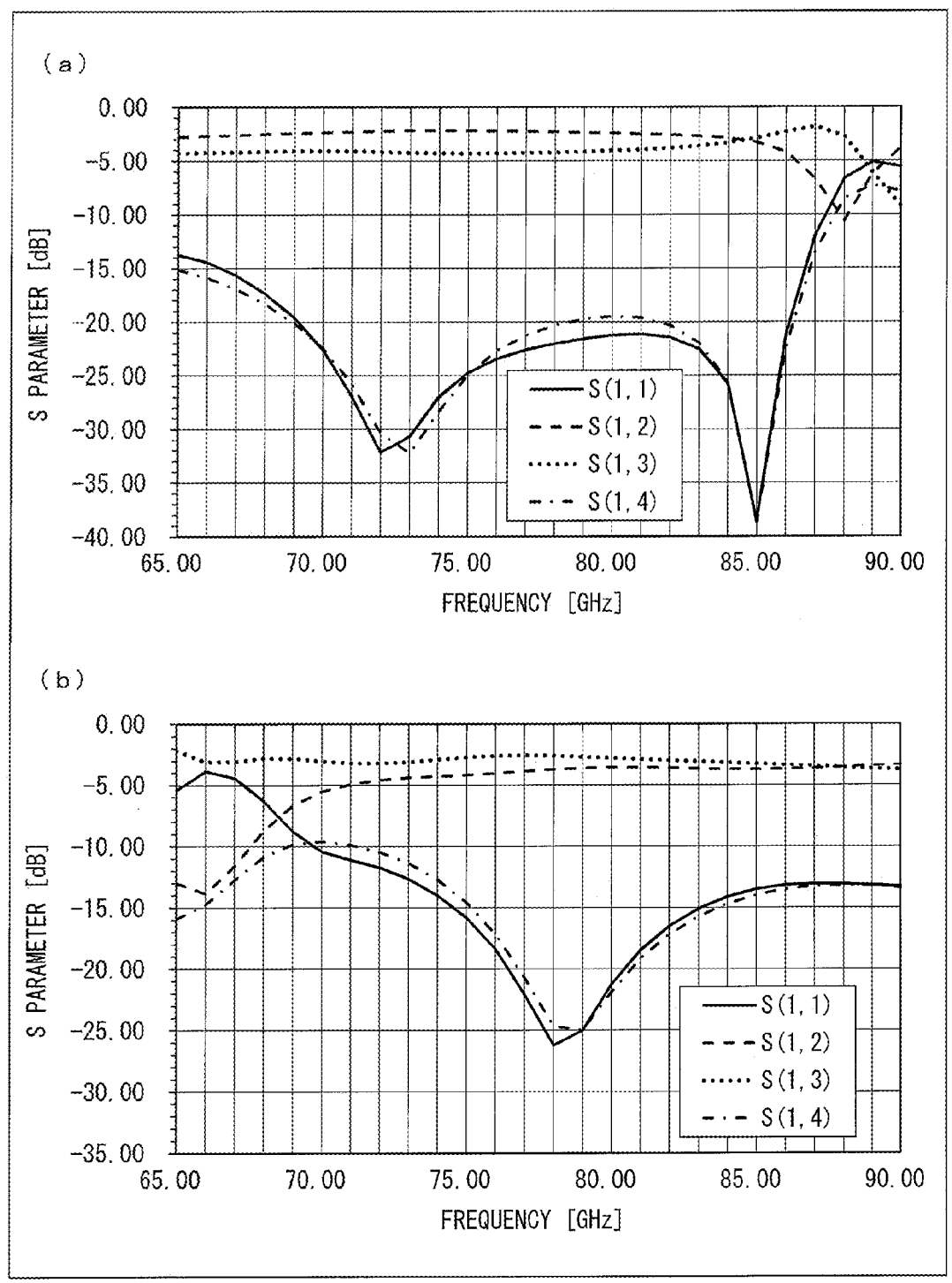

(a) of FIG. 20 is a graph illustrating a frequency dependency of S parameters of one example of the directional coupler in accordance with Variation 13 of the present invention. (b) of FIG. 20 is a graph illustrating a frequency dependency of S parameters of another example of the directional coupler in accordance with Variation 13 of the present invention.

Figure 21:
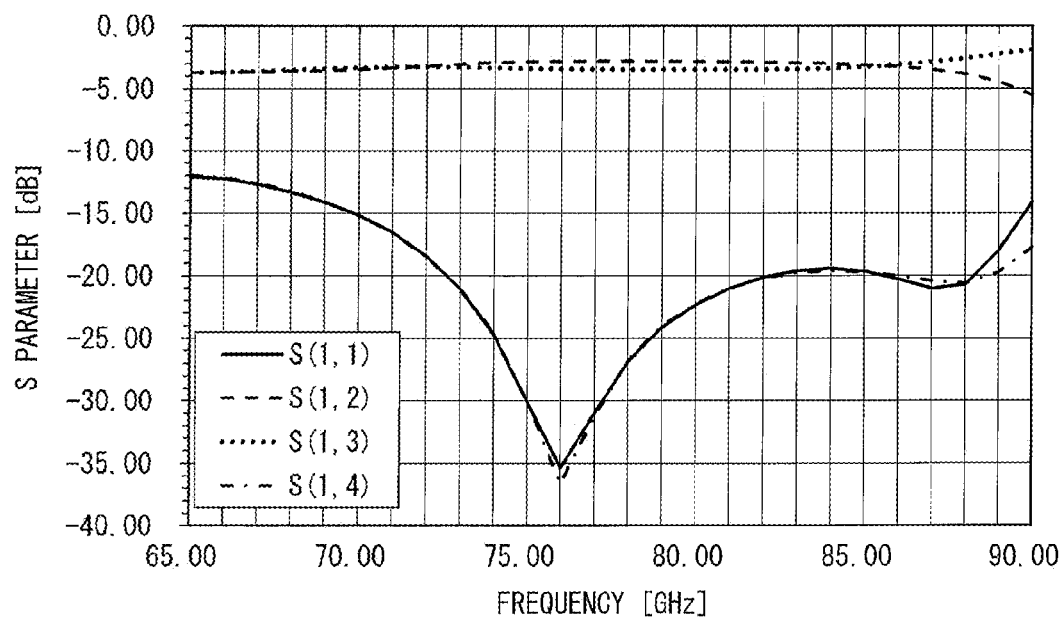

FIG. 21 is a graph illustrating a frequency dependency of S parameters of a directional coupler in accordance with Variation 15.

Figure 22:
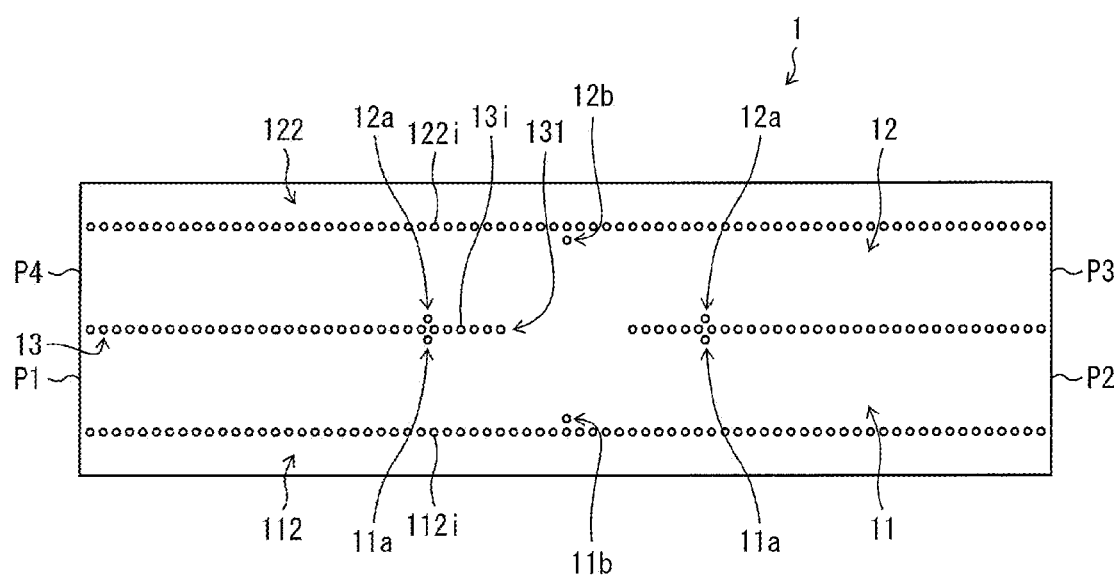

FIG. 22 is a top view illustrating a configuration example of the directional coupler in accordance with Embodiment 1.

Figure 23:
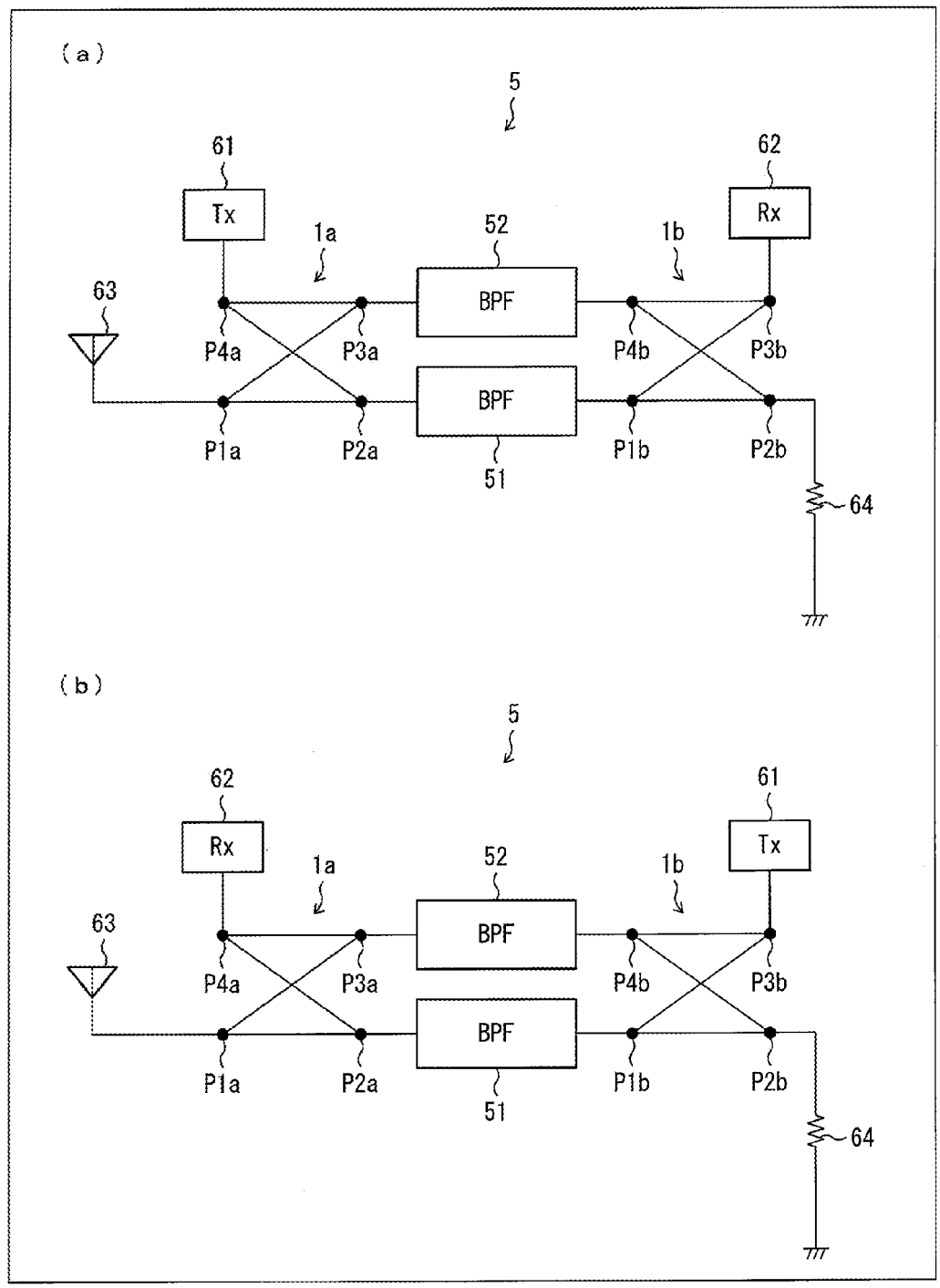

(a) and (b) of FIG. 23 are block diagrams each illustrating a configuration of a diplexer in accordance with Embodiment 2.

Figure 24:
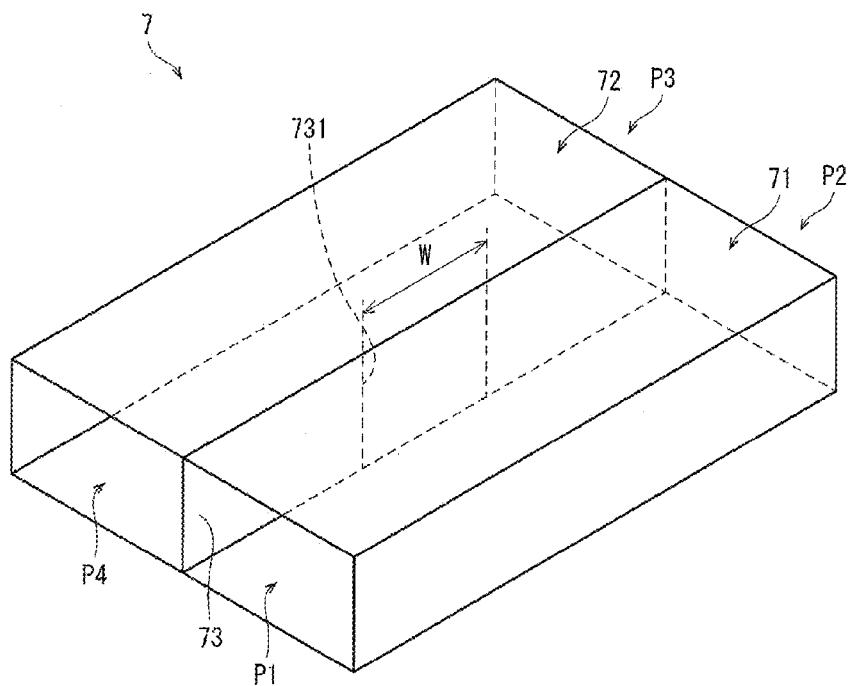

FIG. 24 is a perspective view schematically illustrating a configuration of a directional coupler in accordance with a conventional example.

Figure 25:
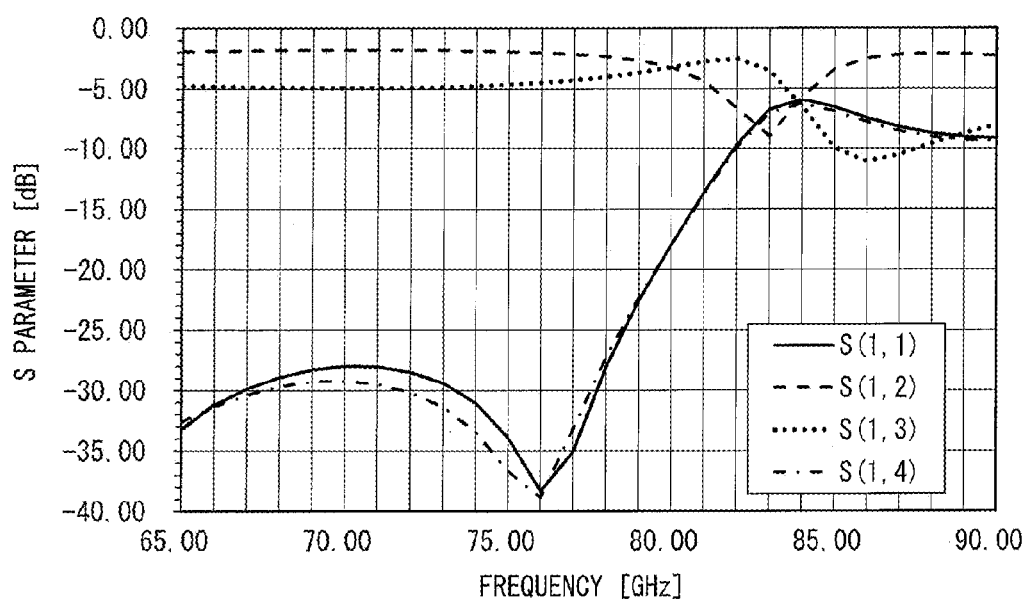

FIG. 25 is a graph illustrating a frequency-dependency of S parameters of the directional coupler.

Figure 26:
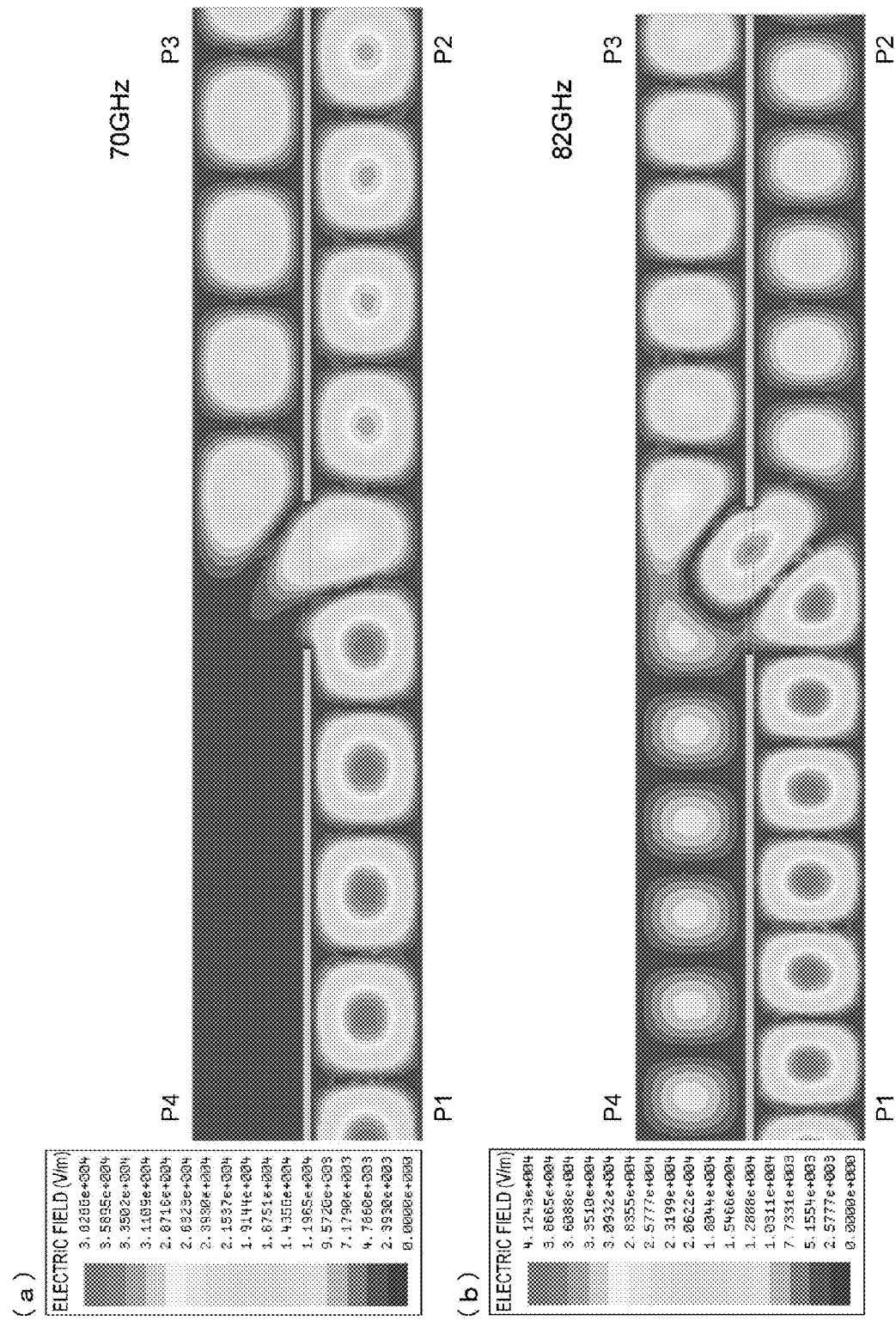

FIG. 26 is a counter view illustrating an electric field strength on an H plane of the directional coupler.

DESCRIPTION OF EMBODIMENTS

Embodiment 1

Figure 1:
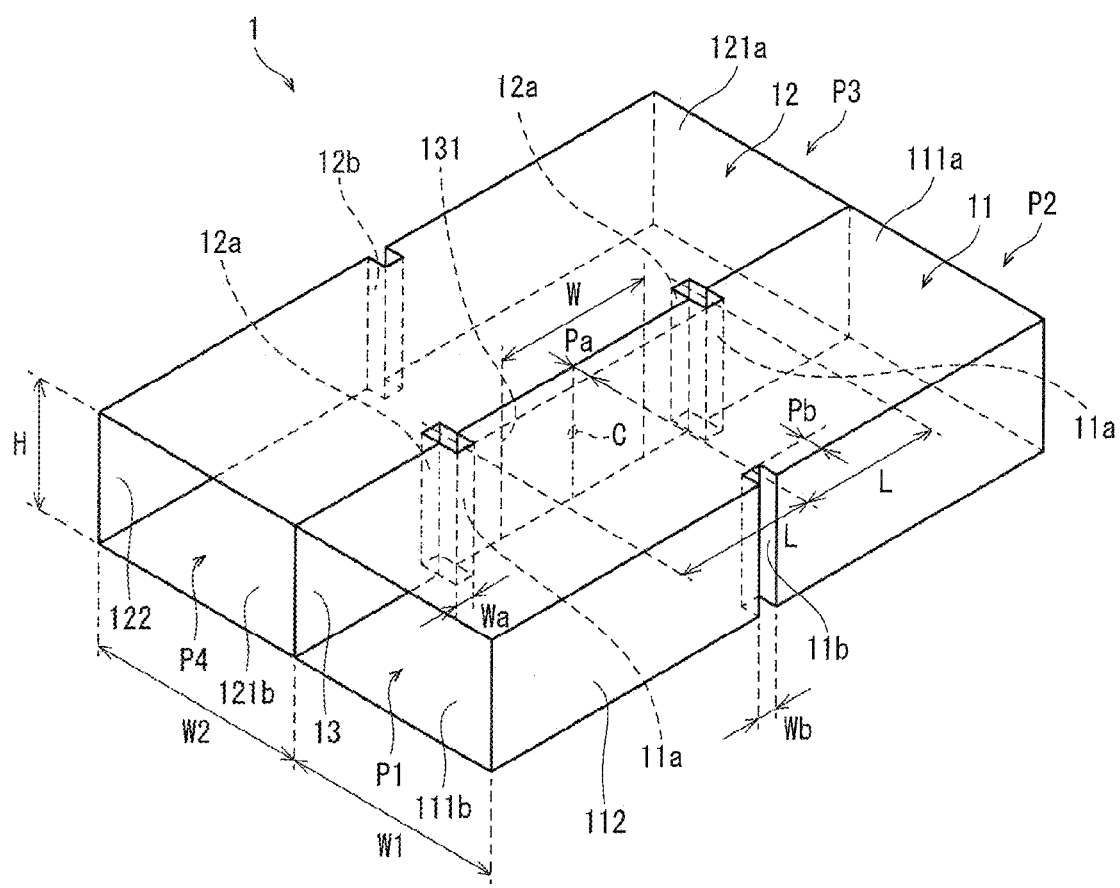
FIG. 1 is a perspective view illustrating a configuration of a directional coupler in accordance with Embodiment 1 of the present invention.

The following description will discuss a directional coupler in accordance with Embodiment 1 of the present invention with reference to FIG. 1. FIG. 1 is a perspective view illustrating a configuration of the directional coupler 1 in accordance with Embodiment 1.

As illustrated in FIG. 1, the directional coupler 1 includes a first waveguide 11 and a second waveguide 12. The first waveguide 11 and the second waveguide 12 have identical heights H. The first waveguide 11 is a rectangular waveguide whose width W1 is longer than the height H. Similarly, the second waveguide 12 is a rectangular waveguide whose width W2 is longer than the height H. The first waveguide 11 and the second waveguide 12 share a narrow wall 13 which is a first narrow wall out of a pair of narrow walls constituting each of the first waveguide 11 and the second waveguide 12.

The first waveguide 11 is a tubular waveguide and includes the narrow wall 13, a narrow wall 112 which is a second narrow wall facing the narrow wall 13, and a pair of wide wall 111a and wide wall 111b. Similarly, the second waveguide 12 is a tubular waveguide and includes the narrow wall 13, a narrow wall 122 which is a second narrow wall facing the narrow wall 13, and a pair of wide wall 121a and wide wall 121b.

The narrow wall 13 has an opening 131. An inside of the first waveguide 11 and an inside of the second waveguide 12 are communicated with each other via the opening 131.

The opening 131 has a height H identical to the heights H of the first waveguide 11 and the second waveguide 12. The first waveguide 11 and the second waveguide 12 are coupled with each other via the opening 131. Therefore, the directional coupler 1 is a directional coupler using an H-plane coupling.

By changing the width W of the opening 131, it is possible to change a degree of coupling between the first waveguide 11 and the second waveguide 12 of the directional coupler 1 (hereinafter, referred to as coupling degree of the directional coupler 1). Note that the width W is an important parameter which controls the coupling degree of the directional coupler 1.

Hereinafter, the directional coupler 1 whose coupling degree is, for example, 3 dB is referred to as a directional coupler with a coupling degree of 3 dB.

According to the directional coupler 1 of Embodiment 1, the first waveguide 11 includes a pair of protruding sections (first protruding sections) 11a and a protruding section (second protruding section) 11b. The second waveguide 12 includes a pair of protruding sections 12a and a protruding section 12b.

(A Pair of Protruding Sections)

The pair of protruding sections 11a are provided, at the first narrow wall 13 or the second narrow wall 112, so as to (i) be symmetrical with respect to the opening 131, (ii) be on an incident side of the opening 131 and on an exit side of the opening, respectively, and (iii) protrude from one of the first narrow wall 13 and the second narrow wall 112 toward the other.

The pair of protruding sections 12a are provided, at the first narrow wall 13 or the second narrow wall 122, so as to (i) be symmetrically with respect to the opening 131, (ii) be on an incident side of the opening 131 and on an exit side of the opening, respectively, and (iii) protrude from one of the first narrow wall 13 and the second narrow wall 122 toward the other. Embodiment 1 thus employs a configuration in which the pair of protruding sections 11a and the pair of protruding sections 12a protrude from the narrow wall 13 toward the second narrow walls 112 and 122, respectively.

According to the directional coupler 1, the first waveguide 11 and the second waveguide 12 are configured to be located plane-symmetrically with respect to the first narrow wall 13. That is, the pair of protruding sections 11a provided in the first waveguide 11 and the pair of protruding sections 12a provided in the second waveguide 12 are configured to be located plane-symmetrically with respect to the first narrow wall 13. Consequently, a distance 2L between two protruding sections, i.e., between the pair of protruding sections 11a is identical to a distance 2L between two protruding sections, i.e., between the pair of protruding sections 12a. Note that, in Embodiment 1, the pair of protruding sections 11a will be described, but the pair of protruding sections 12a will not be described.

As described above, the pair of protruding sections 11a are provided so as to (i) be symmetrical with respect to the opening 131, and (ii) be on an incident side of the opening 131 and on an exit side of the opening, respectively. In other words, the pair of protruding sections 11a are located so as to be plane-symmetrically with respect to a symmetry plane which is a cross-section that (i) is perpendicular to directions in which the waveguides 11 and 12 are extended (long-axis directions of the waveguides 11 and 12) and (ii) passes through a center C of the opening 131. That is, a distance L between the symmetry plane and the respective pair of protruding sections 11a is identical.

Furthermore, the pair of protruding sections 11a have identical shapes. To be more specific, the pair of protruding sections 11a have identical protrusion lengths Pa and identical widths Wa. The protrusion length Pa is a length by which each of the pair of protruding sections 11a protrudes from the first narrow wall 13 toward the second narrow wall 112.

The width W1 of the first waveguide 11 at a position where the pair of protruding sections 11a are provided is narrower, by the protrusion length Pa, than the width W1 of the first waveguide 11 at both ends thereof, i.e. the width W1 at the first port P1 and the width W1 at the second port P2.

The center C of the opening 131 corresponds to a centroid of the opening 131, in a case of assuming that the member, constituting the narrow wall 13, is present also at the opening 131. As illustrated in FIG. 1, in a case where the directional coupler 1 has the opening 131 having a rectangular shape, the center C is an intersecting point of diagonal lines of the opening 131.

In Embodiment 1, the pair of protruding sections 11a each protrude from the first narrow wall 13 toward the second narrow wall 112. Alternatively, a pair of protruding sections 11a can be configured to protrude from the second narrow wall 112 toward the first narrow wall 13.

In a case where, for example, the first port P1 receives a high-frequency signal having a specific frequency band whose lower limit is a target frequency, e.g., a high-frequency signal having a frequency band whose lower limit is a target frequency and whose upper limit is 105% of the target frequency, the directional coupler 1 can make sufficiently small S parameters (S(1,1) and S(1,4)). This is because the directional coupler 1 includes the pair of protruding sections 11a. That is, since the directional coupler 1 includes the pair of protruding sections 11a, the directional coupler 1 can cut return losses in the frequency band as compared with the conventional directional coupler 7.

Hereinafter, a frequency band, whose lower limit is a target frequency and whose upper limit is 105% of the target frequency, is referred to as a frequency band which is not less than 100% and not more than 105% of the target frequency.

A distance 2L between the pair of protruding sections 11a is preferably not less than 142.7% and not more than 196.5% of a guide wavelength in a case where a high-frequency signal having the target frequency is guided in the first waveguide 11 and the second waveguide 12. The directional coupler 1 configured as above can cut return losses in a frequency band of not less than 100% and not more than 105% of the target frequency, as compared with the conventional directional coupler 7.

Furthermore, the protrusion length Pa of the pair of protruding sections 11a is preferably not more than 13.5% of the guide wavelength in a case where a high-frequency signal having the target frequency is guided in the first waveguide 11 and the second waveguide 12. The directional coupler 1 configured as above can cut return losses in a frequency band of not less than 100% and not more than 105% of the target frequency, as compared with the conventional directional coupler 7.

(Other Protruding Section)

The protruding sections 11b and 12b protrude from the second narrow walls 112 and 122, respectively, toward the opening 131, more specifically, toward the center C of the opening 131. The protruding section 11b provided in the first waveguide 11 and the protruding section 12b provided in the second waveguide 12 are configured to be located plane-symmetrically with respect to the first narrow wall 13.

Accordingly, the protruding section 11b will be described, but the protruding section 12b will not be described.

The protruding section 11b is provided at a position facing the center C of the opening 131. A protrusion length Pb of the protruding section 11b can be selected appropriately within a range in which an increase in return loss due to provision of the opening 131 and the pair of protruding sections 11a and 12a can be subdued. Examples of the protrusion length Pb include, but not limited to, 300 μm.

(Configuration of Directional Coupler)

The directional coupler 1 can employ, as each of the first waveguide 11 and the second waveguide 12, a post-wall waveguide or a metal waveguide tube. The post-wall waveguide is a waveguide which is surrounded on all four sides by (i) a pair of waveguide plates provided on respective both sides of the dielectric substrate and (ii) a pair of post walls. The pair of post walls penetrate the dielectric substrate so as to cause the pair of conductor plates to be electrically conductive. Conductor posts are each made of (i) a conductor provided along an inner wall of a through-hole penetrating the dielectric substrate or (ii) a conductor filling the through-hole. A configuration, in which the post-wall waveguide is employed as each of the first waveguide 11 and the second waveguide 12, will be later described with reference to FIG. 22. In a case of employing the post-wall waveguide as each of the first waveguide 11 and the second waveguide 12, it is preferable that the pair of protruding sections 11a, the pair of protruding sections 12a, and the protruding sections 11b and 12b are realized by respective conductor posts which penetrate the dielectric substrate.

In a case of employing a metal waveguide tube as each of the first waveguide 11 and the second waveguide 12, the pair of protruding sections 11a, the pair of protruding sections 12a, and the protruding sections 11b and 12b can be each (i) made by cutting the inside of the waveguide tube, (ii) made by bending one of narrow walls of the metal waveguide tube such that the one of narrow walls protrude toward the other of the narrow walls, or (iii) made of conductor posts. Note that, in order to control respective specific inductive capacities of the inside of the first waveguide 11 and the inside of the second waveguide 12, the respective metal waveguide tubes for the first waveguide 11 and the second waveguide 12 can be filled with a dielectric material with a desired specific inductive capacity. On the other hand, in the case of employing the post-wall waveguide as each of the first waveguide 11 and the second waveguide 12, it is possible to control specific inductive capacities of media of the first waveguide 11 and the second waveguide 12 by selecting dielectric substrates with respective desired specific inductive capacities for the first waveguide 11 and the second waveguide 12.

(Function of Directional Coupler)

In a case where a high-frequency signal enters the first port P1 of the directional coupler 1, the input high-frequency signal is propagated inside the first waveguide 11 and is then caused to exit from the second port P2. Furthermore, the high-frequency signal coupled to the second waveguide 12 via the opening 131 is propagated inside the second waveguide 12 and is caused to exit from the third port P3. The directional coupler 1 thus functions as a divider which receives a high-frequency signal via one port and causes the high-frequency signal to emit via two ports.

Note that the high-frequency signal, which exited from the second port P2, has a phase identical to that of the high-frequency signal which was caused to enter the first port P1. In contrast, the high-frequency signal, which was caused to exit from the third port P3, has a phase shifted by 90° from that of the high-frequency signal which was caused to enter the first port P1. That is, the phase of the high-frequency signal which is caused to exit from the second port P2 is shifted by 90° from the phase of the high-frequency signal which is caused to exit from the third port P3. For this reason, the directional coupler 1 is also referred to as a 90° hybrid.

In a case where (i) a first high-frequency signal is caused to enter the second port P2 and (ii) a second high-frequency signal whose phase is shifted by 90° from that of the first high-frequency signal is caused to enter the third port P3, a high-frequency signal, which is caused by superimposing the first high-frequency signal on the second high-frequency signal, is caused to exit from the first port P1. Thus, the directional coupler 1 also functions as a superimposing unit which receives high-frequency signals via two ports and then causes one high-frequency signal to exit via one port.

EXAMPLES

Figure 2:
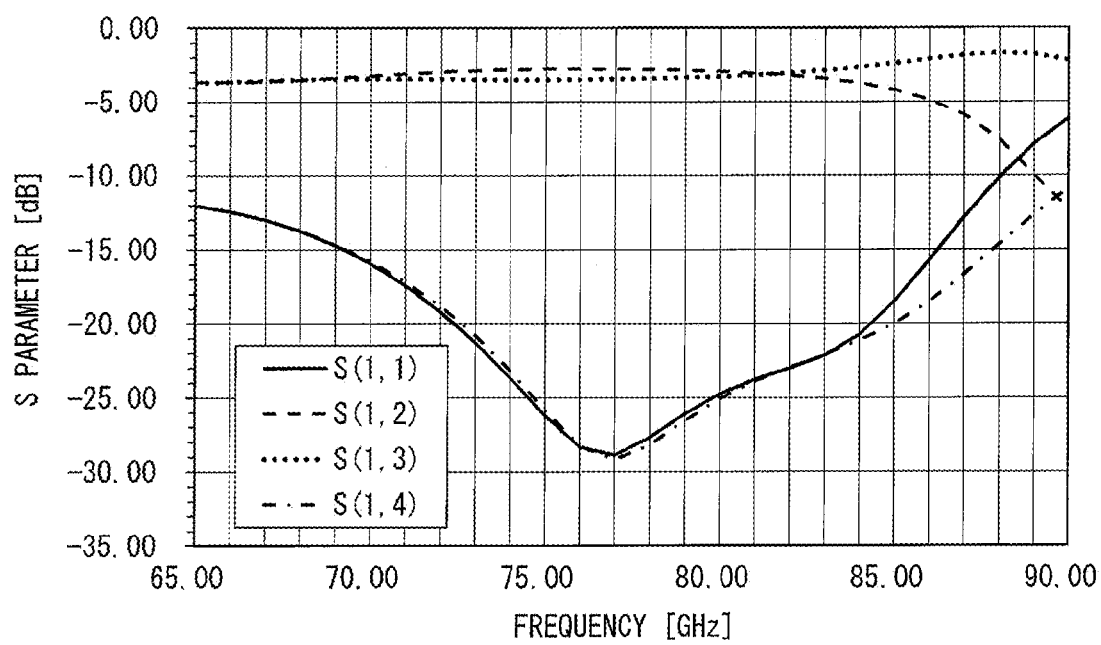
FIG. 2 is a graph illustrating a frequency dependency of S parameters of a directional coupler in accordance with an Example of the present invention.
Figure 3:
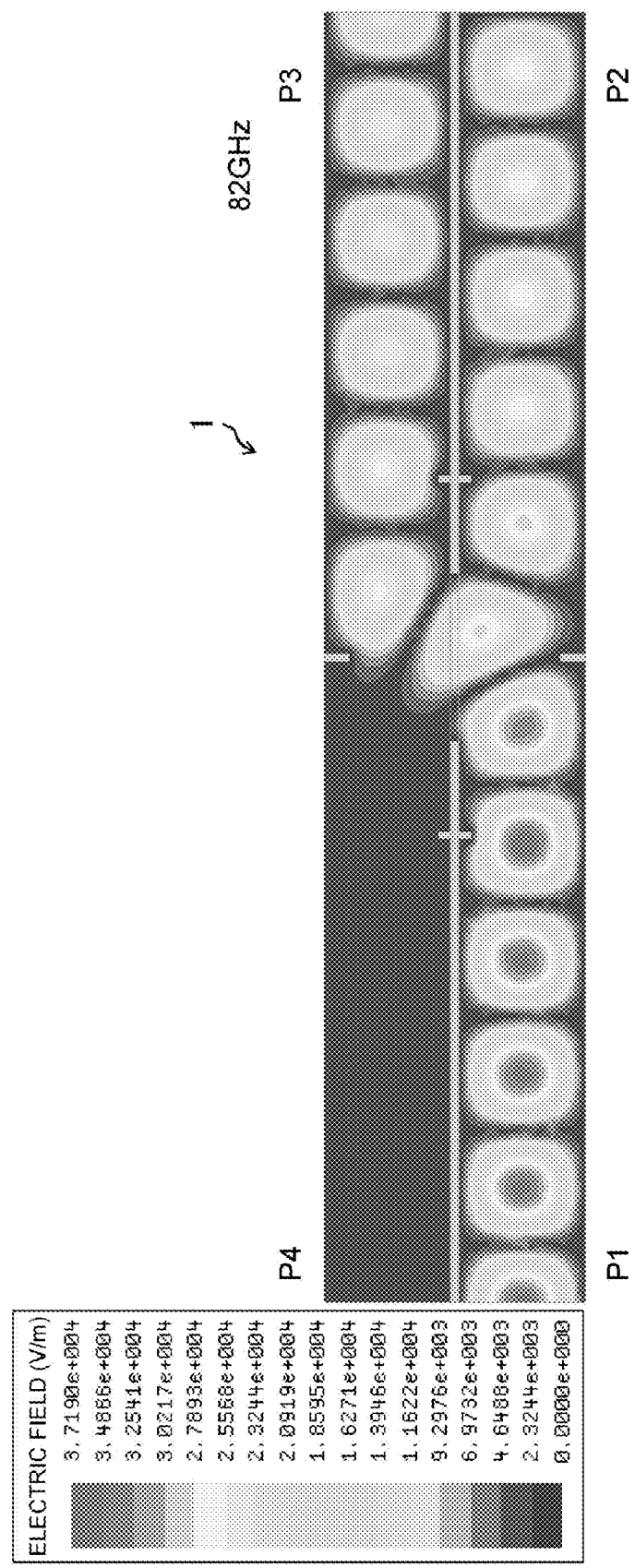
FIG. 3 is a counter view illustrating an electric field strength on an H plane of the directional coupler.

With reference to FIGS. 2 and 3, the following description will discuss a directional coupler in accordance with Example of Embodiment 1. The directional coupler 1 in accordance with the present Example is obtained by setting parameters of the directional coupler 1 in accordance with Embodiment 1 as follows.

A width W1 and a width W2 were each set to 1.47 mm.
A height H was set to 0.5 mm.
A specific inductive capacity of a dielectric material with which the waveguides 11 and 12 were filled was set to 3.823.
The width W was set to 1.95 mm.
A protrusion length Pa and a width Wa for each of the pair of protruding sections 11a and the pair of protruding sections 12a, were set to 150 μm and 100 μm, respectively.
Furthermore, (i) a distance 2L between the pair of protruding sections 11a and (ii) a distance 2L between the pair of protruding sections 12a, were each set to 4.14 mm.
A protrusion length Pb and a width Wb for each of the protruding sections 11b and 12b were set to 300 μm and 100 μm, respectively.
A target frequency of the directional coupler 1 in accordance with the present Example is 78.5 GHz. A high-frequency signal with a frequency of 78.5 GHz has (i) a wavelength of 3.82 mm in a free space and (ii) a wavelength of 1.95 mm in a dielectric material with a specific inductive capacity of 3.823. The high-frequency signal with a frequency of 78.5 GHz has a guide wavelength of 2.6 mm (in two significant figures. 2.61 mm in three significant figures) in the directional coupler 1 configured as above. The aforementioned distance 2L corresponds to 159.2% of the guide wavelength.

The directional coupler 1 in accordance with the present Example is designed as a directional coupler having a coupling degree of 3 dB.

FIG. 2 shows a result of calculation of frequency dependency of S parameters with use of the directional coupler 1 in accordance with the present Example. FIG. 2 is a graph showing a frequency dependency of S parameters of the directional coupler 1 in accordance with the present Example. S parameters of the directional coupler 1 in accordance with the present Example, S(1,1), S(1,2), S(1,3), and S(1,4), were calculated on an assumption that a high-frequency signal was caused to enter the first port P1. Frequency of the high-frequency signal was varied within a frequency range of not less than 65 GHz and not more than 90 GHz. Conditions for calculating a frequency dependency of these S parameters are the same as those for directional couplers 1 in accordance with respective later-described Variations.

Among the S parameters shown in FIG. 2, S(1,1) indicates a ratio of a power of a high-frequency signal reflected from the first port P1 to a power of a high-frequency signal caused to enter the first port P1. Similarly, S(1,2), S(1,3), and S(1,4) indicate respective ratios of powers of high-frequency signals caused to exit from the second port P2, the third port P3, and the fourth port P4 to a power of a high-frequency signal caused to enter the first port P1.

In the present specification, a standard for determining whether a directional coupler operates as a directional coupler is based on whether S(1,1) and S(1,4) are each less than −13 dB at a target frequency. Furthermore, a standard for determining whether a directional coupler operates more preferably as a directional coupler is based on whether a difference between S(1,2) and S(1,3) is less than 1.0 dB.

As is clear from FIG. 2, S(1,1) and S(1,4) were each less than −13 dB in a frequency band of not less than 67.2 GHz and not more than 86.8 GHz. That is, it is found that the directional coupler 1 in accordance with the present Example can cut return losses in a frequency band of not less than 67.2 GHz and not more than 86.8 GHz including a frequency band of not less than 100% and not more than 105% of 78.5 GHz which is a target frequency, i.e. a frequency band of not less than 78.5 GHz and not more than 82.4 GHz (in three significant figures. 82.425 GHz in five significant figures).

Furthermore, in a frequency band of not less than 65 GHz and not more than 83.6 GHz, a difference between S(1,2) and S(1,3) was less than 1.0 dB. That is, in consideration of the frequency band in which the return loss can be cut, the directional coupler 1 in accordance with the present Example operates more preferably as a directional coupler having a coupling degree of 3 dB in a frequency band of not less than 67.2 GHz and not more than 83.6 GHz.

FIG. 3 shows a result of calculation of an electric field strength on an H plane of the directional coupler 1 in accordance with the present Example. FIG. 3 is a counter view illustrating an electric field strength on the H plane of the directional coupler 1. It is found from FIG. 3 that an electric field strength distributed for the waveguides 11 and 12 via the opening 131 was not disturbed.

In contrast, as has been described, in a case of an electric field strength on an H plane of a conventional directional coupler 7 illustrated in (b) of FIG. 26, an electric field strength distributed for waveguides 71 and 72 via an opening 731 was disturbed.

In consideration of the results, the inventors infer that it is highly likely that a higher mode appears in the state where the electric field strength is disturbed. The inventors also infer that there is a close relationship between (i) appearance of the higher mode and (ii) an increase in return loss and a deterioration in directivity of the directional coupler (respective increases in S(1,1) and S(1,4)). Accordingly, the inventors have found that, in order to provide the directional coupler 1 which operates as a directional coupler at a target frequency, it is important to (i) design a pair of protruding sections 11a and a pair of protruding sections 12a each having a shape which does not disturb an electric field strength distributed for the waveguides 11 and 12 via the opening 131 and (ii) further design protruding sections 11b and 12b each having a shape capable of cutting return losses caused by providing the opening 131 and the pair of protruding sections 11a and the pair of protruding sections 12a.

[Variation 1]

Figure 4:
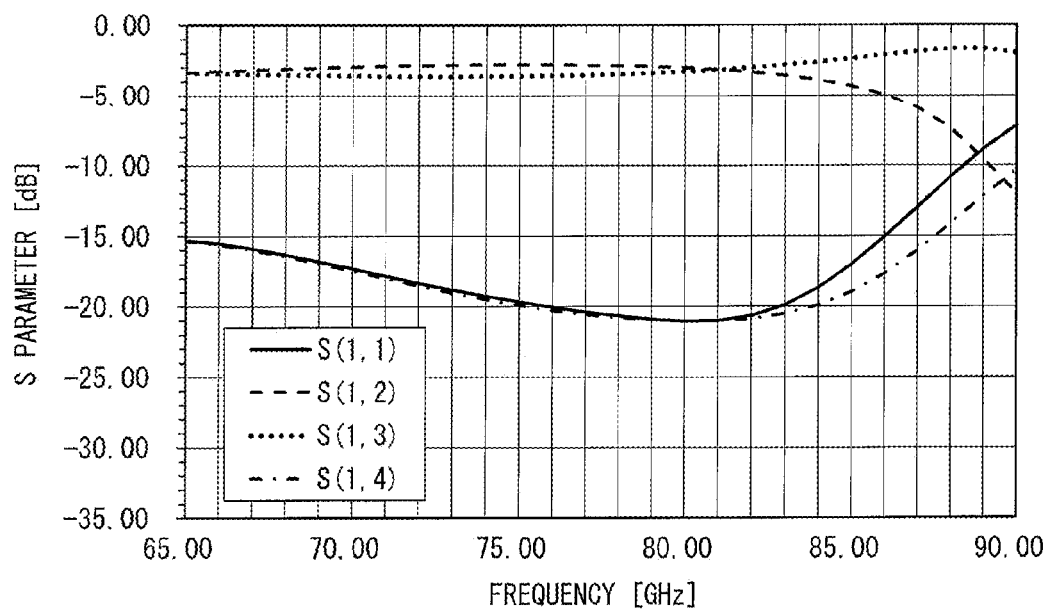
FIG. 4 is a graph illustrating a frequency dependency of S parameters of a directional coupler in accordance with Variation 1 of the present invention.

With reference to FIG. 4, the following description will discuss a directional coupler in accordance with Variation 1 of the present invention. The directional coupler 1 in accordance with Variation 1 is obtained by employing, in the directional coupler 1 of Embodiment 1, (i) 50 μm as a protrusion length Pa of each of the pair of protruding sections 11a and the pair of protruding sections 12a and (ii) 300 μm as a protrusion length Pb of each of the protruding sections 11b and 12b.

FIG. 4 shows the result of calculation of a frequency dependency of S parameters with use of the directional coupler 1 in accordance with Variation 1. FIG. 4 is a graph showing a frequency dependency of S parameters of the directional coupler 1 in accordance with Variation 1.

As is clear from FIG. 4, S(1,1) and S(1,4) were each less than −13 dB in a frequency band of not less than 65.0 GHz and not more than 86.9 GHz. That is, it is found that the directional coupler 1 in accordance with Variation 1 can cut return losses in a frequency band of not less than 65.0 GHz and not more than 86.9 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 65.0 GHz and not more than 83.3 GHz, a difference between S(1,2) and S(1,3) was less than 1.0 dB. That is, in consideration of the frequency band in which the return loss can be cut, it is found that the directional coupler 1 in accordance with Variation 1 operates more preferably as a directional coupler having a coupling degree of 3 dB in a frequency band of not less than 65.0 GHz and not more than 83.3 GHz.

[Variation 2]

Figure 5:
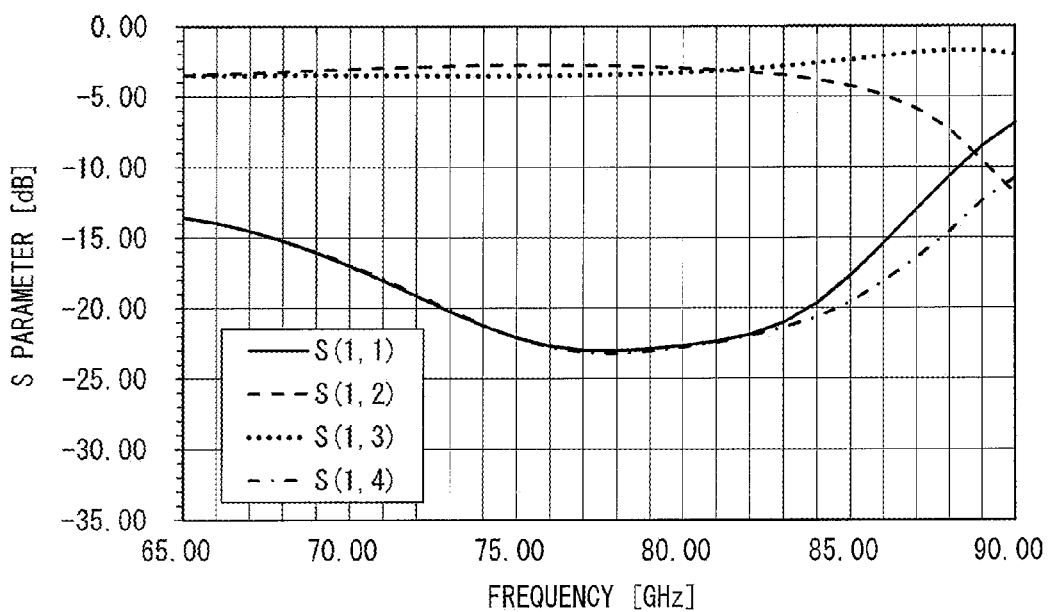
FIG. 5 is a graph illustrating a frequency dependency of S parameters of a directional coupler in accordance with Variation 2 of the present invention.

With reference to FIG. 5, the following description will discuss a directional coupler in accordance with Variation 2 of the present invention. The directional coupler 1 in accordance with Variation 2 is obtained by employing, in the directional coupler 1 in accordance with Embodiment 1, (i) 100 μm as a protrusion length Pa of each of the pair of protruding sections 11a and the pair of protruding sections 12a and (ii) 300 μm as a protrusion length Pb of each of the protruding sections 11b and 12b.

FIG. 5 shows the result of calculation of a frequency dependency of S parameters with use of the directional coupler 1 in accordance with Variation 2. FIG. 5 is a graph showing a frequency dependency of S parameters of the directional coupler 1 in accordance with Variation 2.

As is clear from FIG. 5, S(1,1) and S(1,4) were each less than −13 dB in a frequency band of not less than 65.0 GHz and not more than 86.9 GHz. That is, it is found that the directional coupler 1 in accordance with Variation 2 can cut return losses in a frequency band of not less than 65.0 GHz and not more than 86.9 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 65.0 GHz and not more than 83.6 GHz, a difference between S(1,2) and S(1,3) was less than 1.0 dB. That is, in consideration of the frequency band in which the return loss can be cut, it is found that the directional coupler 1 in accordance with Variation 2 operates more preferably as a directional coupler having a coupling degree of 3 dB in a frequency band of not less than 65.0 GHz and not more than 83.6 GHz.

[Variation 3]

Figure 6:
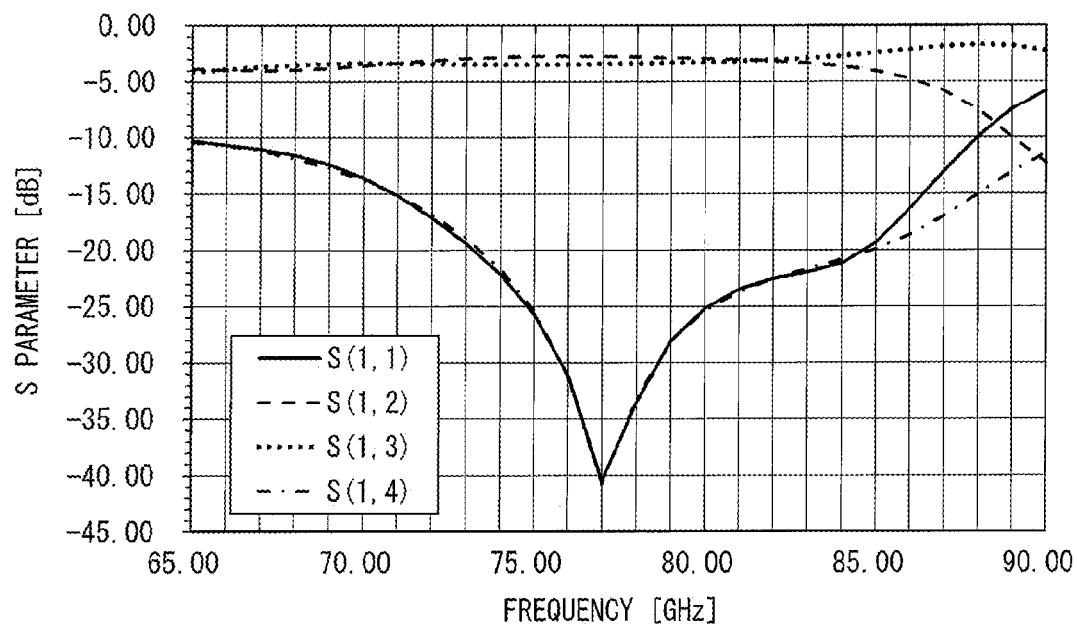
FIG. 6 is a graph illustrating a frequency dependency of S parameters of a directional coupler in accordance with Variation 3 of the present invention.

With reference to FIG. 6, the following description will discuss a directional coupler in accordance with Variation 3 of the present invention. The directional coupler 1 in accordance with Variation 3 is obtained by employing, in the directional coupler 1 in accordance with Embodiment 1, (i) 200 μm as a protrusion length Pa of each of the pair of protruding sections 11a and the pair of protruding sections 12a and (ii) 300 μm as a protrusion length Pb of each of the protruding sections 11b and 12b.

FIG. 6 shows the result of calculation of a frequency dependency of S parameters with use of the directional coupler 1 in accordance with Variation 3. FIG. 6 is a graph showing a frequency dependency of S parameters of the directional coupler 1 in accordance with Variation 3.

As is clear from FIG. 6, S(1,1) and S(1,4) were each less than −13 dB in a frequency band of not less than 69.7 GHz and not more than 86.9 GHz. That is, it is found that the directional coupler 1 in accordance with Variation 3 can cut return losses in a frequency band of not less than 69.7 GHz and not more than 86.9 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 65.0 GHz and not more than 84.2 GHz, a difference between S(1,2) and S(1,3) was less than 1.0 dB. That is, in consideration of the frequency band in which the return loss can be cut, it is found that the directional coupler 1 in accordance with Variation 3 operates more preferably as a directional coupler having a coupling degree of 3 dB in a frequency band of not less than 69.7 GHz and not more than 84.2 GHz.

[Variation 4]

Figure 7:
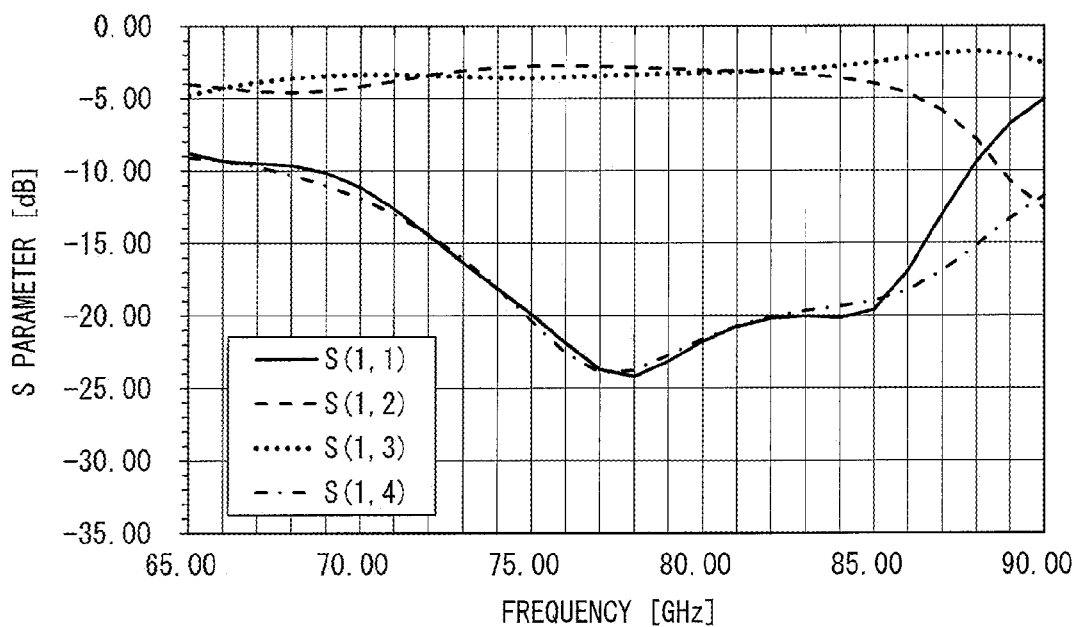
FIG. 7 is a graph illustrating a frequency dependency of S parameters of a directional coupler in accordance with Variation 4 of the present invention.

With reference to FIG. 7, the following description will discuss a directional coupler in accordance with Variation 4 of the present invention. The directional coupler 1 in accordance with Variation 4 is obtained by employing, in the directional coupler 1 in accordance with Embodiment 1, (i) 250 μm as a protrusion length Pa of each of the pair of protruding sections 11a and the pair of protruding sections 12a and (ii) 300 μm as a protrusion length Pb of each of the protruding sections 11b and 12b.

FIG. 7 shows the result of calculation of frequency dependency of S parameters with use of the directional coupler 1 in accordance with Variation 4. FIG. 7 is a graph showing a frequency dependency of S parameters of the directional coupler 1 in accordance with Variation 4.

As is clear from FIG. 7, S(1,1) and S(1,4) were each less than −13 dB in a frequency band of not less than 71.3 GHz and not more than 86.8 GHz. That is, it is found that the directional coupler 1 in accordance with Variation 4 can cut return losses in a frequency band of not less than 71.3 GHz and not more than 86.8 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 65.0 GHz and not more than 68.0 GHz and a frequency band of not less than 69.8 GHz and not more than 84.2 GHz, a difference between S(1,2) and S(1,3) was less than 1.0 dB. That is, in consideration of the frequency band in which the return loss can be cut, the directional coupler 1 in accordance with Variation 4 operates more preferably as a directional coupler having a coupling degree of 3 dB in a frequency band of not less than 71.3 GHz and not more than 84.2 GHz.

[Variation 5]

Figure 8:
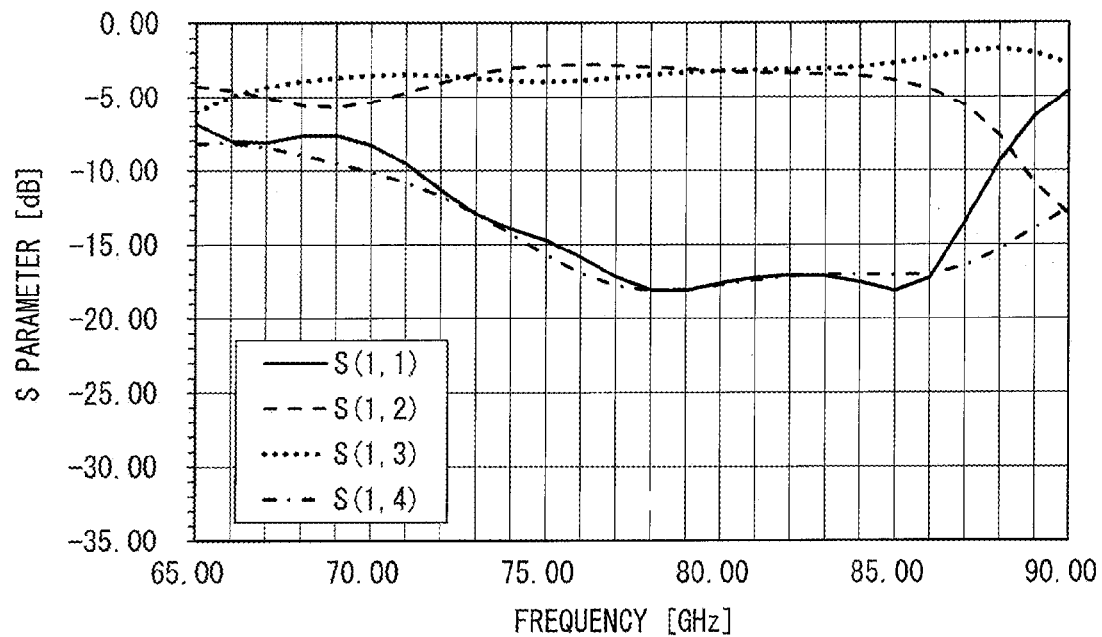
FIG. 8 is a graph illustrating a frequency dependency of S parameters of a directional coupler in accordance with Variation 5 of the present invention.

With reference to FIG. 8, the following description will discuss a directional coupler in accordance with Variation 5 of the present invention. The directional coupler 1 in accordance with Variation 5 is obtained by employing, in the directional coupler 1 in accordance with Embodiment 1, (i) 300 μm as a protrusion length Pa of each of the pair of protruding sections 11a and the pair of protruding sections 12a and (ii) 300 μm as a protrusion length Pb of each of the protruding sections 11b and 12b.

FIG. 8 shows the result of calculation of a frequency dependency of S parameters with use of the directional coupler 1 in accordance with Variation 5. FIG. 8 is a graph showing a frequency dependency of S parameters of the directional coupler 1 in accordance with Variation 5.

As is clear from FIG. 8, S(1,1) and S(1,4) were each less than −13 dB in a frequency band of not less than 73.1 GHz and not more than 87.0 GHz. That is, it is found that the directional coupler 1 in accordance with Variation 5 can cut return losses in a frequency band of not less than 73.1 GHz and not more than 87.0 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 71.5 GHz and not more than 74.2 GHz and a frequency band of not less than 76.9 GHz and not more than 84.6 GHz, a difference between S(1,2) and S(1,3) was less than 1.0 dB.

That is, in consideration of the frequency band in which the return loss can be cut, it is found that the directional coupler 1 in accordance with Variation 5 operates more preferably as a directional coupler having a coupling degree of 3 dB in a frequency band of not less than 73.1 GHz and not more than 74.2 GHz and a frequency band of not less than 76.9 GHz and not more than 84.6 GHz.

[Variation 6]

Figure 9:
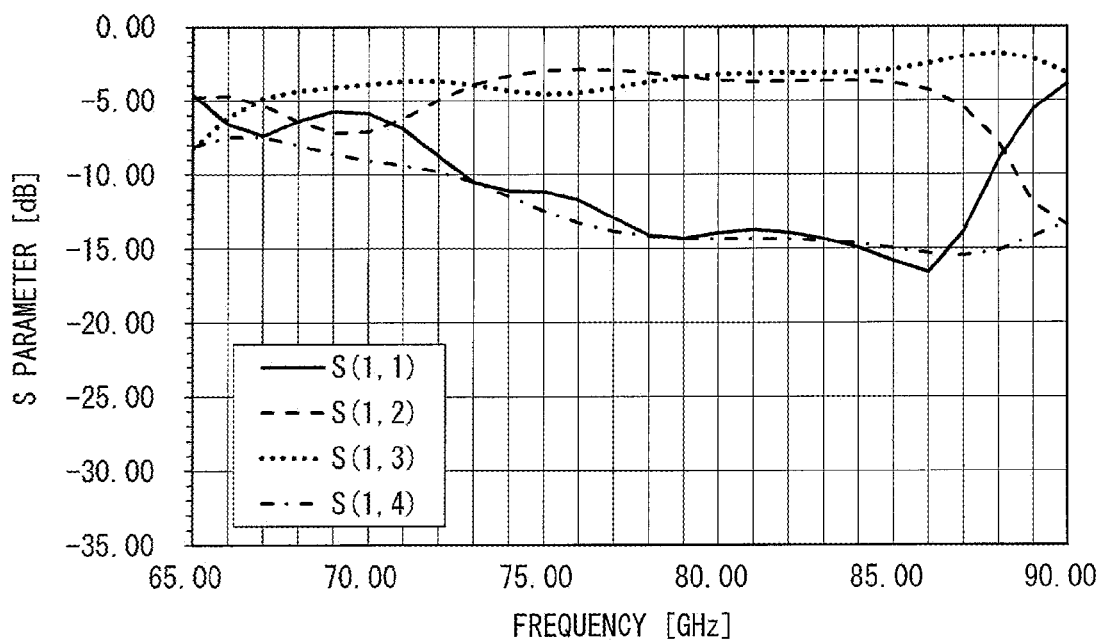
FIG. 9 is a graph illustrating a frequency dependency of S parameters of a directional coupler in accordance with Variation 6 of the present invention.

With reference to FIG. 9, the following description will discuss a directional coupler in accordance with Variation 6 of the present invention. The directional coupler 1 in accordance with Variation 6 is obtained by employing, in the directional coupler 1 in accordance with Embodiment 1, (i) 350 μm as a protrusion length Pa of each of the pair of protruding sections 11a and the pair of protruding sections 12a and (ii) 300 μm as a protrusion length Pb of each of the protruding sections 11b and 12b.

FIG. 9 shows the result of calculation of a frequency dependency of S parameters with use of the directional coupler 1 in accordance with Variation 6. FIG. 9 is a graph showing a frequency dependency of S parameters of the directional coupler 1 in accordance with Variation 6.

As is clear from FIG. 9, S(1,1) and S(1,4) were each less than −13 dB in a frequency band of not less than 77.1 GHz and not more than 87.1 GHz. That is, it is found that the directional coupler 1 in accordance with Variation 6 can cut return losses in a frequency band of not less than 77.1 GHz and not more than 87.1 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 77.5 GHz and not more than 85.0 GHz, a difference between S(1,2) and S(1,3) was less than 1.0 dB. That is, in consideration of the frequency band in which the return loss can be cut, it is found that the directional coupler 1 in accordance with Variation 6 operates more preferably as a directional coupler having a coupling degree of 3 dB in a frequency band of not less than 77.5 GHz and not more than 85 GHz.

(Regarding Protrusion Length Pa)

As described above, it is found that with frequency dependencies of S parameters obtained with use of the directional couplers 1 in accordance with Variations 1 to 6 (see FIGS. 4 to 9), in a case where the protrusion length Pa is not more than 350 μm, the directional coupler 1 in accordance with the present embodiment can cut return losses in a frequency band of not less than 100% and not more than 105% of 78.5 GHz which is a target frequency. 350 μm corresponds to 13.5% of the guide wavelength which is 2.6 mm. That is, in the directional coupler 1 in accordance with the present embodiment, the protrusion length Pa is not more than 13.5% of the guide wavelength in a case where a high-frequency signal with a target frequency is guided in the first waveguide 11 and the second waveguide 12.

[Variation 7]

Figure 10:
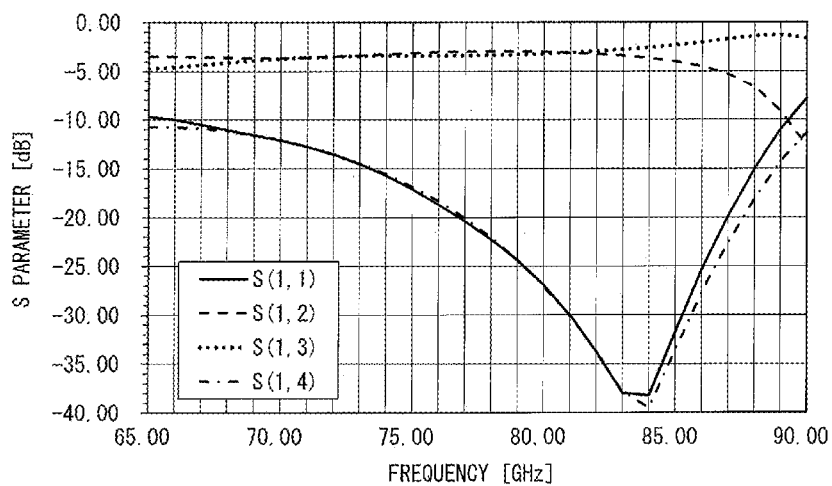
FIG. 10 is a graph illustrating a frequency dependency of S parameters of a directional coupler in accordance with Variation 7 of the present invention.

With reference to FIG. 10, the following description will discuss a directional coupler 1 in accordance with Variation 7 of the present invention. The directional coupler 1 in accordance with Variation 7 is obtained by causing each of the pair of protruding sections 11a and the pair of protruding sections 12a of the directional coupler 1 in accordance with Variation 3 (see FIG. 6) to be moved by 200 μm in a direction closer to the opening 131. That is, the directional coupler 1 in accordance with Variation 7 employs (i) the pair of protruding sections 11a having a distance 2L of 3.74 mm and (ii) the pair of protruding sections 12a having a distance 2L of 3.74 mm.

FIG. 10 shows the result of calculation of a frequency dependency of S parameters with use of the directional coupler 1 in accordance with Variation 7. FIG. 10 is a graph showing a frequency dependency of S parameters of the directional coupler 1 in accordance with Variation 7.

As is clear from FIG. 10, S(1,1) and S(1,4) were each less than −13 dB in a frequency band of not less than 71.4 GHz and not more than 88.3 GHz. That is, it is found that the directional coupler 1 in accordance with Variation 7 can cut return losses in a frequency band of not less than 71.4 GHz and not more than 88.3 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 66.5 GHz and not more than 83.6 GHz, a difference between S(1,2) and S(1,3) was less than 1.0 dB. That is, in consideration of the frequency band in which the return loss can be cut, it is found that the directional coupler 1 in accordance with Variation 7 operates more preferably as a directional coupler having a coupling degree of 3 dB in a frequency band of not less than 71.4 GHz and not more than 83.6 GHz.

[Variation 8]

Figure 11:
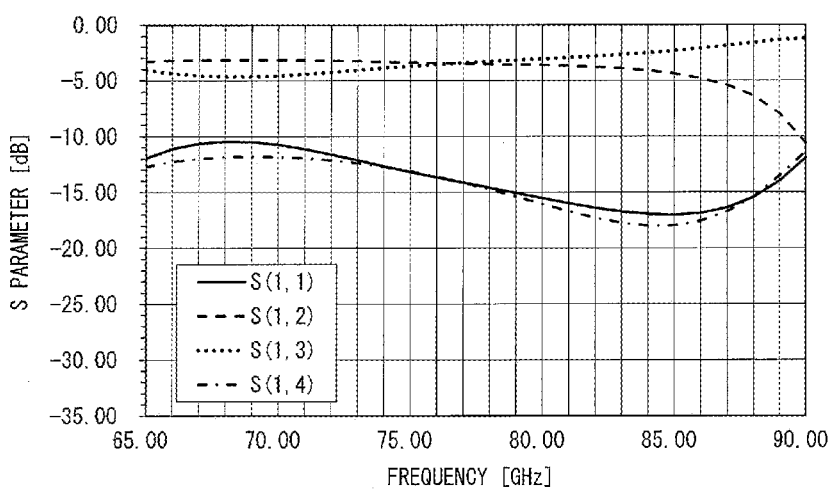
FIG. 11 is a graph illustrating a frequency dependency of S parameters of a directional coupler in accordance with Variation 8 of the present invention.

With reference to FIG. 11, the following description will discuss the directional coupler 1 in accordance with Variation 8 of the present invention. The directional coupler 1 in accordance with Variation 8 is obtained by causing each of the pair of protruding sections 11a and the pair of protruding sections 12a of the directional coupler 1 in accordance with Variation 3 (see FIG. 6) to be moved by 500 μm in a direction closer to the opening 131. That is, the directional coupler 1 in accordance with Variation 8 employs (i) the pair of protruding sections 11a having a the distance 2L of 3.14 mm and (ii) the pair of protruding sections 12a having a distance 2L of 3.14 mm.

FIG. 11 shows the result of calculation of a frequency dependency of S parameters with use of the directional coupler 1 in accordance with Variation 8. FIG. 11 is a graph showing a frequency dependency of S parameters of the directional coupler 1 in accordance with Variation 8.

As is clear from FIG. 11, S(1,1) and S(1,4) were each less than −13 dB at a frequency band of not less than 74.9 GHz and not more than 89.1 GHz. That is, it is found that the directional coupler 1 in accordance with Variation 8 can cut return losses in a frequency band of not less than 74.9 GHz and not more than 89.1 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 72.8 GHz and not more than 82.0 GHz, a difference between S(1,2) and S(1,3) was less than 1.0 dB. That is, in consideration of the frequency band in which the return loss can be cut, it is found that the directional coupler 1 in accordance with Variation 8 operates more preferably as a directional coupler having a coupling degree of 3 dB in a frequency band of not less than 74.9 GHz and not more than 82.0 GHz.

[Variation 9]

Figure 12:
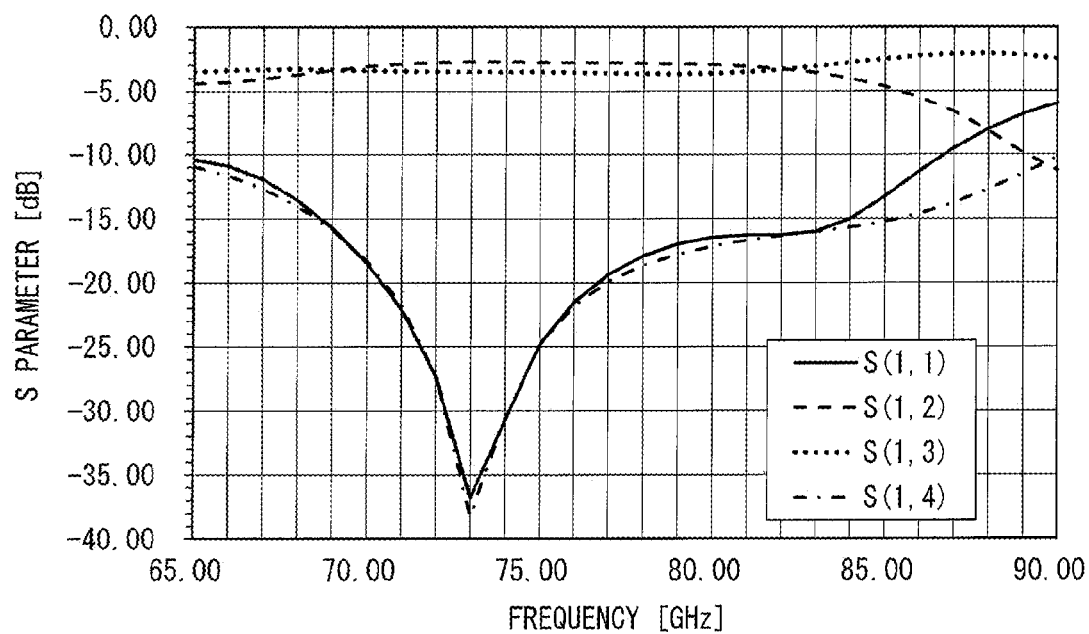
FIG. 12 is a graph illustrating a frequency dependency of S parameters of a directional coupler in accordance with Variation 9 of the present invention.

With reference to FIG. 12, the following description will discuss the directional coupler 1 in accordance with Variation 9 of the present invention. The directional coupler 1 in accordance with Variation 9 is obtained by causing each of the pair of protruding sections 11a and the pair of protruding sections 12a of the directional coupler 1 in accordance with Variation 3 (see FIG. 6) to be moved by 200 μm in a direction away from the opening 131. That is, the directional coupler 1 in accordance with Variation employs (i) the pair of protruding sections 11a having a distance 2L of 4.54 mm and (ii) the pair of protruding sections 12a having a distance 2L of 4.54 mm.

FIG. 12 shows the result of calculation of a frequency dependency of S parameters with use of the directional coupler 1 in accordance with Variation 9. FIG. 12 is a graph showing a frequency dependency of S parameters of the directional coupler 1 in accordance with Variation 9.

As is clear from FIG. 12, S(1,1) and S(1,4) were each less than −13 dB in a frequency band of not less than 67.9 GHz and not more than 85.0 GHz. That is, it is found that the directional coupler 1 in accordance with Variation 9 can cut return losses in a frequency band of not less than 67.9 GHz and not more than 85.0 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 65.0 GHz and not more than 83.5 GHz, a difference between S(1,2) and S(1,3) was less than 1.0 dB. That is, in consideration of the frequency band in which the return loss can be cut, it is found that the directional coupler 1 in accordance with Variation 9 operates more preferably as a directional coupler having a coupling degree of 3 dB in a frequency band of not less than 67.9 GHz and not more than 83.5 GHz.

[Variation 10]

Figure 13:
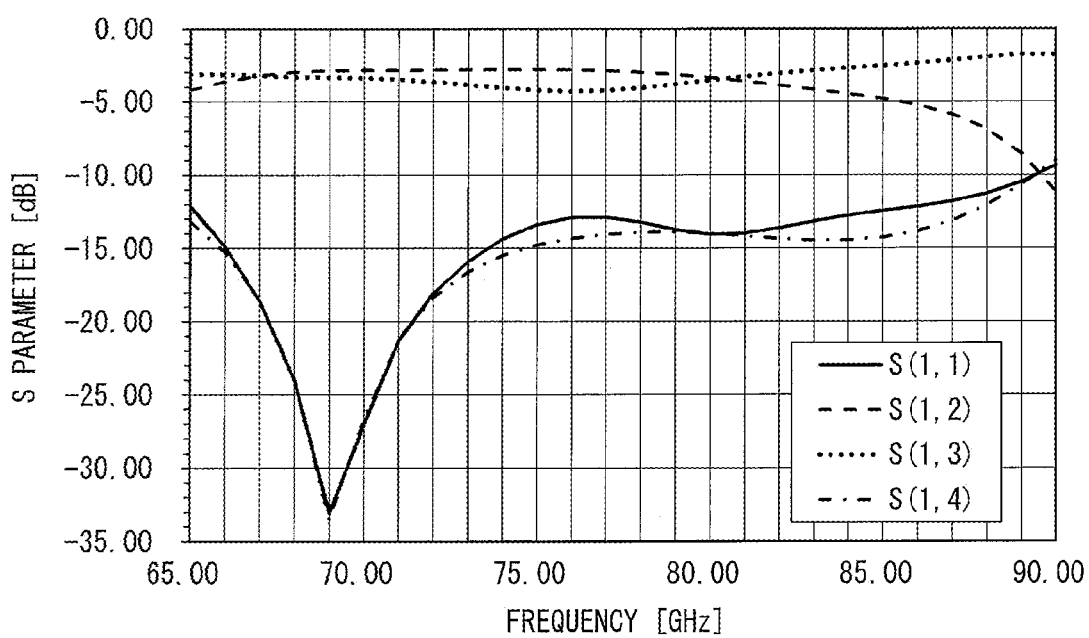
FIG. 13 is a graph illustrating a frequency dependency of S parameters of a directional coupler in accordance with Variation 10 of the present invention.

With reference to FIG. 13, the following description will discuss the directional coupler 1 in accordance with Variation 10 of the present invention. The directional coupler 1 in accordance with Variation 10 is obtained by causing each of the pair of protruding sections 11a and the pair of protruding sections 12a of the directional coupler 1 in accordance with Variation 3 (see FIG. 6) to be moved by 500 μm in a direction away from the opening 131. That is, the directional coupler 1 in accordance with Variation 10 employs (i) the pair of protruding sections 11a having a distance 2L of 5.14 mm and the pair of protruding sections 12a having a distance 2L of 5.14 mm.

FIG. 13 shows the result of calculation of a frequency dependency of S parameters with use of the directional coupler 1 in accordance with Variation 10. FIG. 13 is a graph illustrating a frequency dependency of S parameters of the directional coupler 1 in accordance with Variation 10.

As is clear from FIG. 13, S(1,1) and S(1,4) were each less than −13 dB in a frequency band of not less than 65.4 GHz and not more than 75.7 GHz and a frequency band of not less than 77.5 GHz and not more than 83.2 GHz. That is, it is found that the directional coupler 1 in accordance with Variation 10 can cut return losses in a frequency band of not less than 77.5 GHz and not more than 83.2 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 65.5 GHz and not more than 72.0 GHz and a frequency band of not less than 78.0 GHz and not more than 81.8 GHz, a difference between S(1,2) and S(1,3) was less than 1.0 dB. That is, in consideration of the frequency band in which the return loss can be cut, the directional coupler 1 in accordance with Variation 10 operates more preferably as a directional coupler having a coupling degree of 3 dB in a frequency band of not less than 65.5 GHz and not more than 72.0 GHz and a frequency band of not less than 78.0 GHz and not more than 81.8 GHz.

(Regarding Distance 2L)

As described above, it was found that with frequency dependencies of S parameters obtained with use of the directional couplers 1 in accordance with Variations 7 to 10 (see FIGS. 10 to 13), in a case where the distance 2L between the pair of protruding sections 11a and between the pair of protruding sections 12a is not less than 3.14 mm and not more than 5.14 mm, the directional coupler 1 in accordance with the present embodiment can cut return losses in a frequency band of not less than 100% and not more than 105% of 78.5 GHz which is a target frequency. 3.14 mm corresponds to 120.8% of the guide wavelength which is 2.6 mm, and 5.14 mm corresponds to 197.7% of the guide wavelength which is 2.6 mm. That is, in the directional coupler 1 in accordance with the present embodiment, the distance 2L is not less than 120.8% and not more than 197.7% of the guide wavelength in a case where a high-frequency signal with a target frequency is guided in the first waveguide 11 and the second waveguide 12.

[Variation 11]

Figure 14:
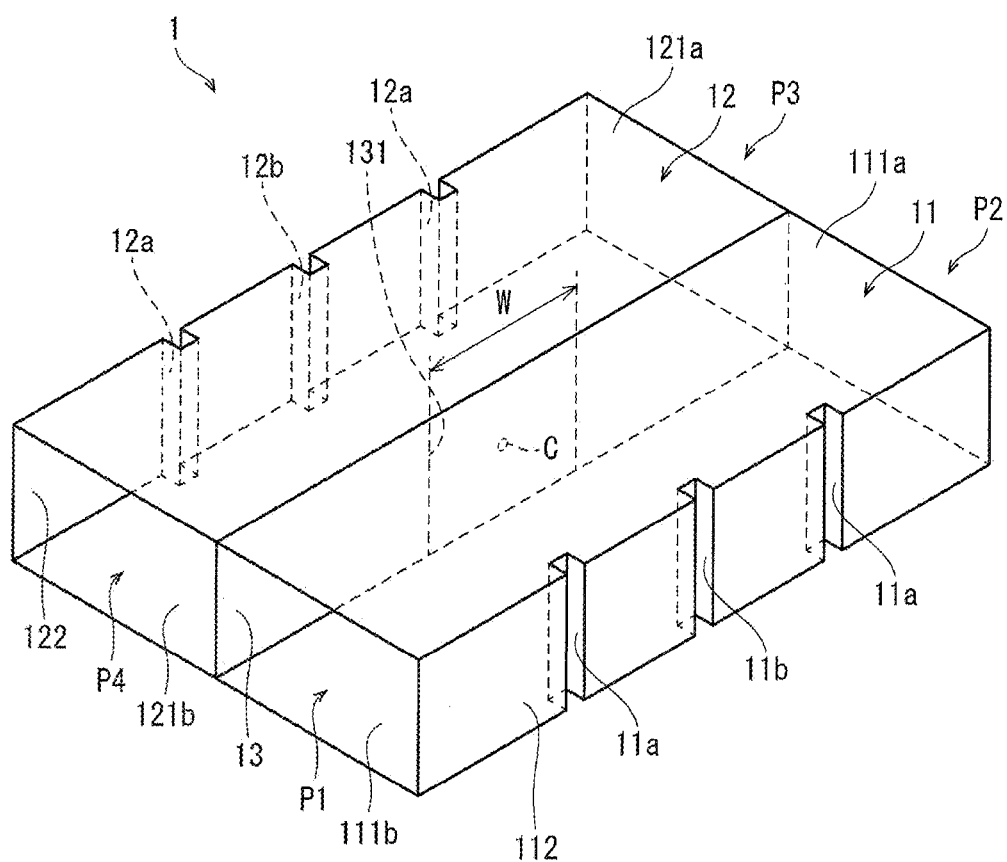
FIG. 14 is a perspective view illustrating a configuration of a directional coupler in accordance with Variation 11 of the present invention.
Figure 15:
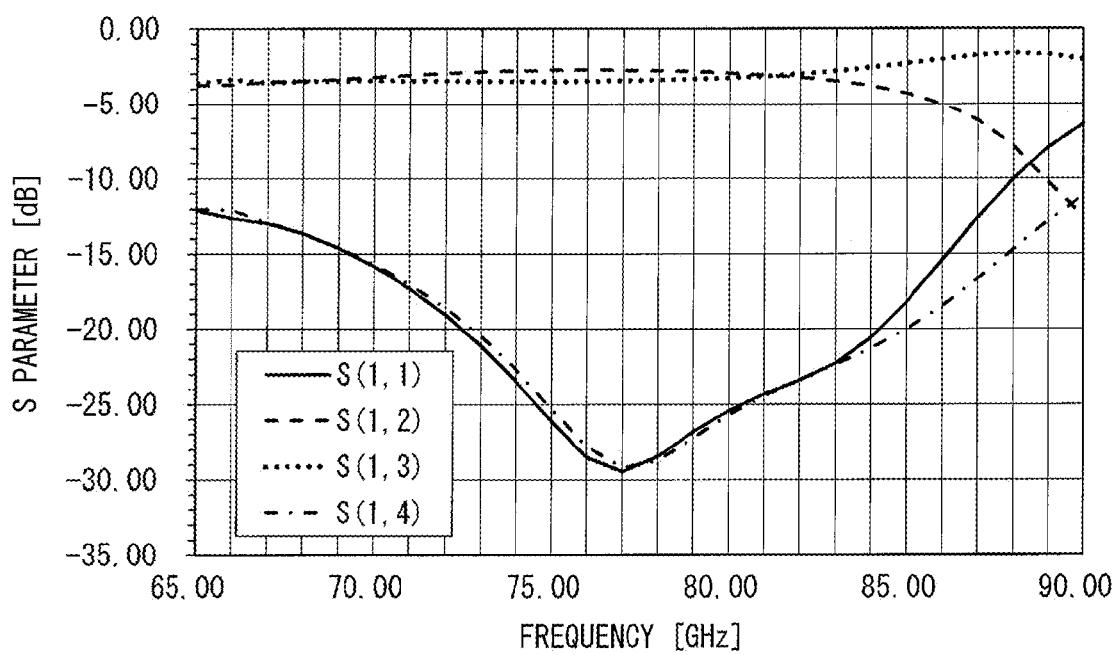
FIG. 15 is a graph illustrating a frequency dependency of S parameters of a directional coupler in accordance with Variation 11 of the present invention.

With reference to FIGS. 14 and 15, the following description will discuss the directional coupler 1 in accordance with Variation 11 of the present invention. FIG. 14 is a perspective view showing a configuration of the directional coupler 1 in accordance with Variation 11.

The directional coupler 1 in accordance with Variation 11 is obtained by changing the pair of protruding sections 11a and the pair of protruding sections 12a of the directional coupler 1 in accordance with the present Example. Specifically, the directional coupler 1 in accordance with Variation 11 employs (i) a pair of protruding sections 11a each protruding from the second narrow wall 112 toward the first narrow wall 13 and (ii) a pair of protruding sections 12a each protruding from the second narrow wall 122 toward the first narrow wall 13, instead of (i') the pair of protruding sections 11a each protruding from the first narrow wall 13 toward the second narrow wall 112 and (ii') the pair of protruding sections 12a each protruding from the first narrow wall 13 toward the second narrow wall 122.

FIG. 15 shows the result of calculation of a frequency dependency of S parameters with use of the directional coupler 1 in accordance with Variation 11. FIG. 15 is a graph showing a frequency dependency of S parameters of the directional coupler 1 in accordance with Variation 11.

As is clear from FIG. 15, S(1,1) and S(1,4) were each less than −13 dB in a frequency band of not less than 67.2 GHz and not more than 86.7 GHz. That is, it is found that the directional coupler 1 in accordance with Variation 11 can cut return losses in a frequency band of not less than 67.2 GHz and not more than 86.7 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 65.0 GHz and not more than 83.5 GHz, a difference between S(1,2) and S(1,3) was less than 1.0 dB. That is, in consideration of the frequency band in which the return loss can be cut, it is found that the directional coupler 1 in accordance with Variation 11 operates more preferably as a directional coupler having a coupling degree of 3 dB in a frequency band of not less than 67.2 GHz and not more than 83.5 GHz.

As described above, the directional coupler 1 in accordance with the present embodiment may employ (i) the pair of protruding sections 11a each protruding from the second narrow wall 112 toward the first narrow wall 13 and (ii) the pair of protruding sections 12a each protruding from the second narrow wall 122 toward the first narrow wall 13.

[Variation 12]

Figure 16:
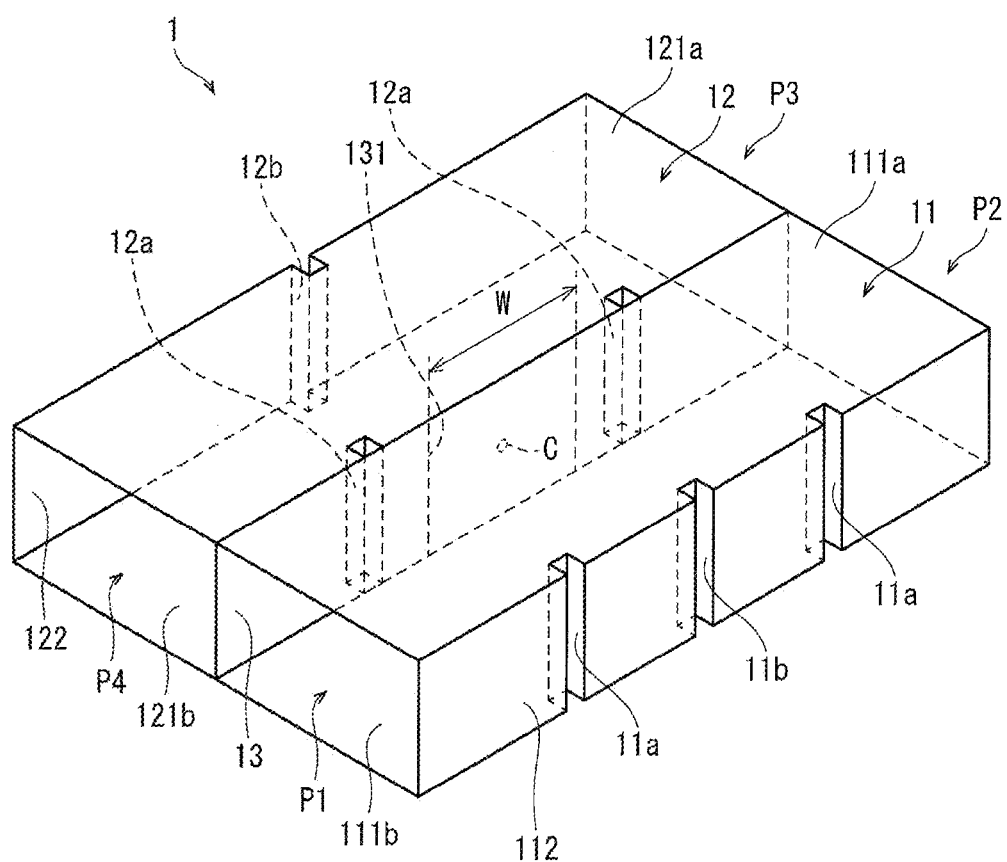
FIG. 16 is a perspective view illustrating a configuration of a directional coupler in accordance with Variation 12 of the present invention.

With reference to FIG. 16, the following description will discuss the directional coupler 1 in accordance with Variation 12 of the present invention. FIG. 16 is a perspective view illustrating a configuration of the directional coupler 1 in accordance with Variation 12.

The directional coupler 1 in accordance with Variation 12 is obtained by changing the pair of protruding sections 11a and the pair of protruding sections 12a of the directional coupler 1 in accordance Embodiment 1. Specifically, the directional coupler 1 in accordance with Variation 12 employs a pair of protruding sections 11a provided in the first waveguide 11 each of which protrudes from the second narrow wall 112 toward the first narrow wall 13, instead of protruding from the first narrow wall 13 toward the second narrow wall 112. In other words, the directional coupler 1 in accordance with the Variation 12 is obtained by changing the pair of protruding sections 12a provided in the second waveguide 12 of the directional coupler 1 in accordance with Variation 11 such that the pair of protruding sections 12a protrude from the first narrow wall 13 toward the second narrow wall 122, instead of protruding from the second narrow wall 122 toward the first narrow wall 13.

That is, in a configuration where the first narrow wall 13 is one of the narrow walls and the second narrow walls 112 and 122 are each the other of the narrow walls, the pair of protruding sections 11a provided in the first waveguide 11 protrude from the other of the narrow walls toward the one of the narrow walls, and the pair of protruding sections 12a provided in the second waveguide 12 protrude from the one of the narrow walls toward the other of the narrow walls.

As described above, in the directional coupler 1 in accordance with one aspect of the present invention, the pair of protruding sections 11a and the pair of protruding sections 12a may be arranged such that (1) the pair of protruding sections 11a and the pair of protruding sections 12a are both provided at the first narrow wall 13 (see Examples), (2) the pair of protruding sections 11a are provided at the second narrow wall 112 and the pair of protruding sections 12a are provided at the second narrow wall 122 (see Variation 11), or (3) one pair of the pair of protruding sections 11a and the pair of protruding sections 12a are provided at the first narrow wall and the other pair are provided at the second narrow wall (Variation 12).

Also in the directional coupler 1 in accordance with Variation 12, in a configuration in which the pair of protruding sections 11a are located plane-symmetrically and the pair of protruding sections 12a are located plane-symmetrically with respect to a symmetry plane which is a cross section that (i) is perpendicular to directions in which the waveguides 11 and 12 extend and (ii) passes through the center C of the opening 131, it is preferable that (1) a distance L between each of the pair of protruding sections 11a and the symmetry plane is identical to (2) a distance L between each of the pair of protruding sections 12a and the symmetry plane.

The directional coupler 1 in accordance with Variation 12 configured as above yields an effect similar to that of the directional coupler 1 in accordance with the Examples.

[Variations 13 through 15]

Figure 17:
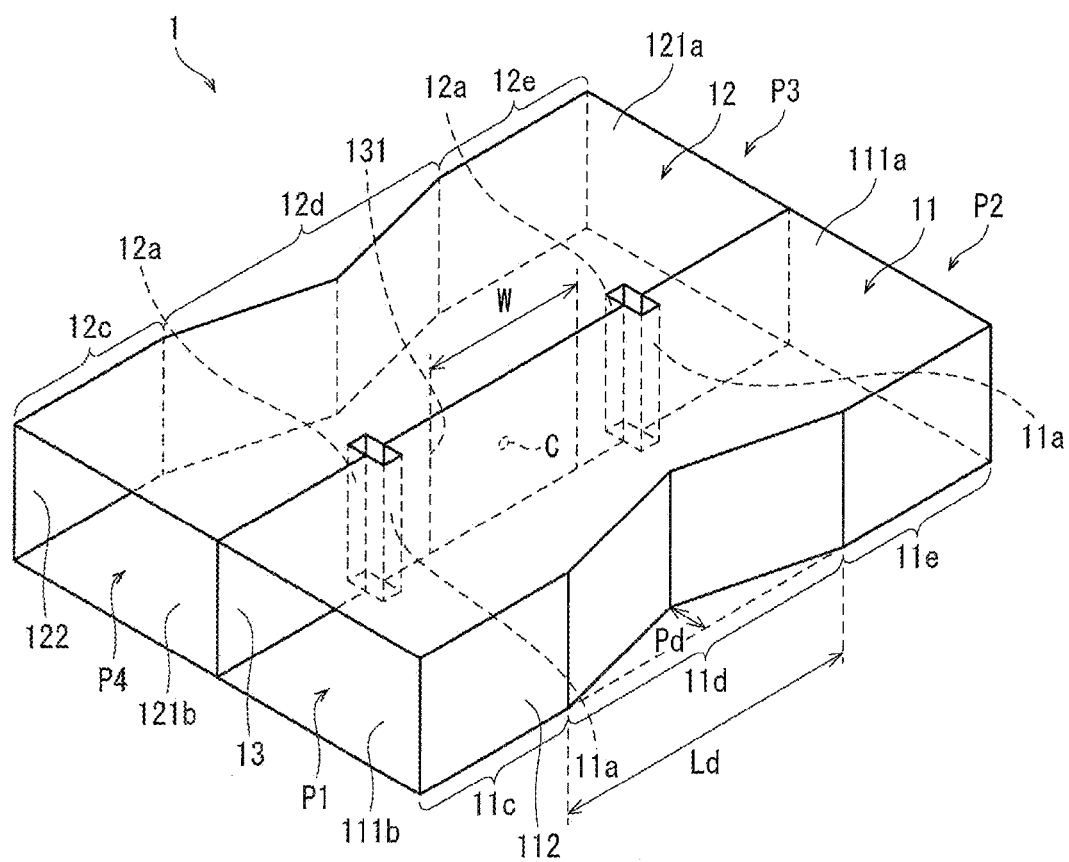
FIG. 17 is a perspective view illustrating a configuration of a directional coupler in accordance with Variation 13 of the present invention.
Figure 18:
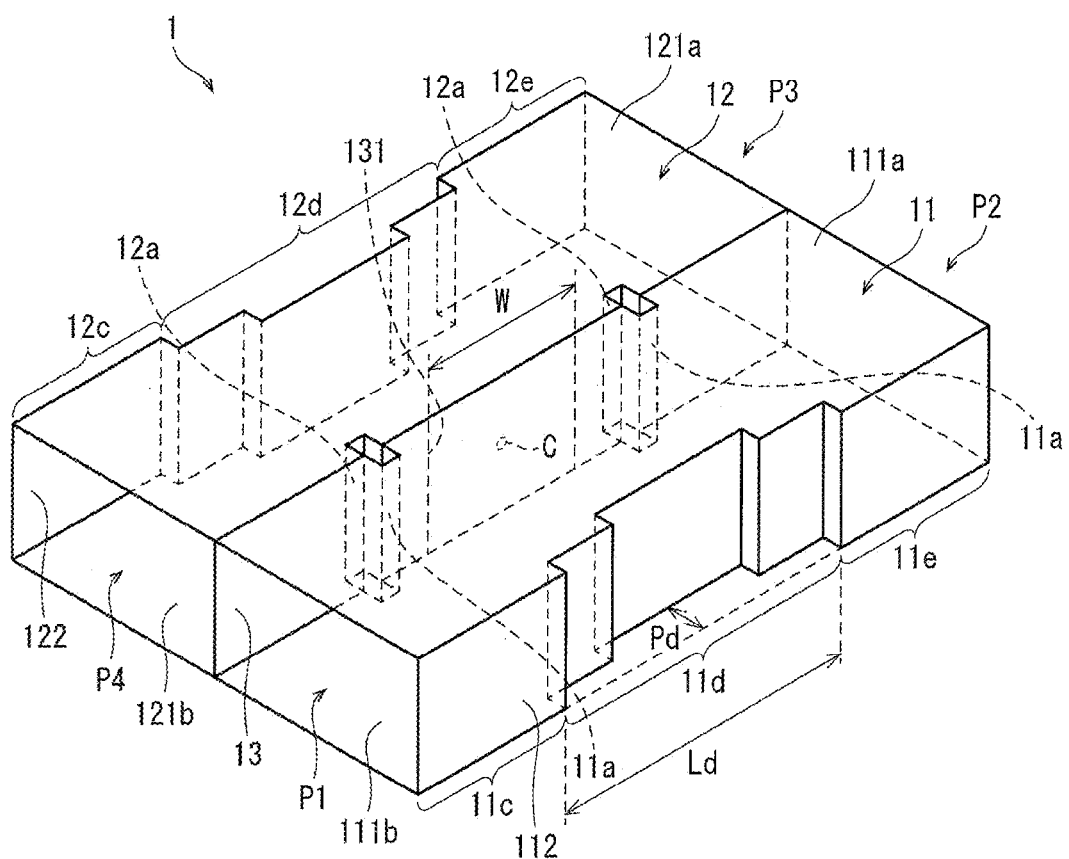
FIG. 18 is a perspective view illustrating a configuration of a directional coupler in accordance with Variation 14 of the present invention.
Figure 19:
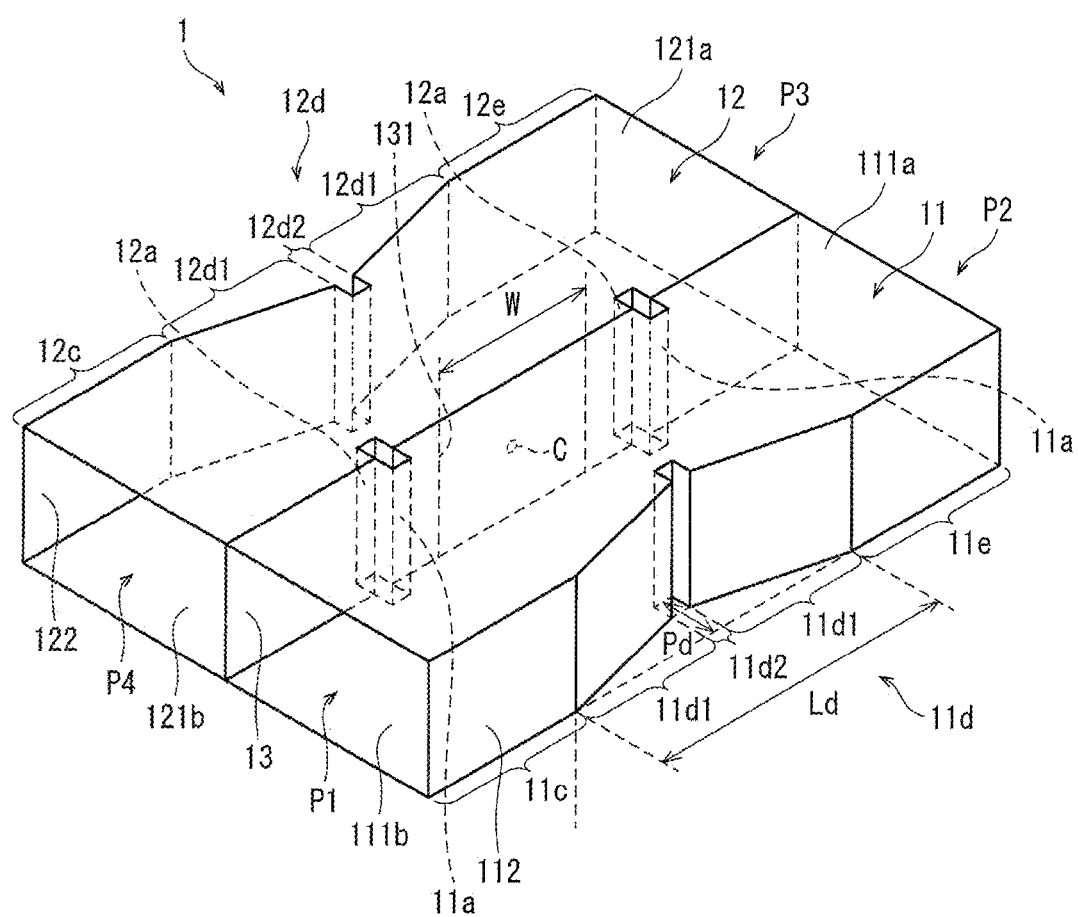
FIG. 19 is a perspective view illustrating a configuration of a directional coupler in accordance with Variation 15 of the present invention.

With reference to FIGS. 17 through 21, the following description will discuss directional couplers in accordance with Variations 13 through 15 of the present invention. FIGS. 17 through 19 are perspective views illustrating configurations of directional couplers 1 in accordance with the respective Variations 13 through 15. A description will be first provided below as to the directional coupler 1 in accordance with Variation 13.

The directional couplers 1 in accordance with Variations 13 through 15 are each obtained by replacing, with protruding parts 11d and 12d, the protruding sections 11b and 12b of the directional coupler 1 of the present Example. The first waveguide 11 and the second waveguide 12 are plane-symmetrical with respect to the first narrow wall 13. As such, only the protruding part 11d will be discussed and the protruding part 12d will not be discussed. Note that the protruding parts 11d and 12d are each a genre of a second protruding section recited in claims of the present application.

(Protruding Part 11d)

The first waveguide 11 includes the protruding part 11d which (i) is a part of the narrow wall 112 facing the opening 131, (ii) is provided between a first part 11c having a certain width W1 and a second part 11e having a certain width W1, and (iii) protrudes toward the opening 131. A protrusion length Pd by which the narrow wall 112 protrudes toward the narrow wall 13 is larger at a center of the protruding part 11d than at both ends of the protruding part 11d (a part where the protruding part 11d is connected with the first part 11c and a part where the protruding part 11d is connected with the second part 11e). That is, the protrusion length Pd at the center of the protruding part 11d is larger than the protrusion length Pd at both ends of the protruding part 11d, and a width of the first waveguide 11 at the center of the protruding part 11d is smaller than a width of the first waveguide 11 at both ends of the protruding part 11d.

(Classification of Protruding Part 11d)

The protruding part 11d is classified here depending on how a protrusion length Pd changes in the protruding part.

Hereinafter, the directional coupler 1, including the protruding part 11d which is configured such that the protrusion length Pd is larger as farther from both ends of the protruding part and closer to the center of the protruding part, is referred to as a directional coupler of a taper type. Depending on how the protrusion length Pd changes, the directional coupler 1 of the taper type is classified into three types, i.e., (1) a slope taper type, (2) a step taper type, and (3) a slope step taper type. The directional coupler 1 in accordance with Variation 13 illustrated in FIG. 17 is a slope taper type. The directional coupler 1 in accordance with Variation 14 illustrated in FIG. 18 is a step taper type. The directional coupler 1 in accordance with Variation 15 illustrated in FIG. 19 is a slope step taper type.

The directional coupler 1 of the slope taper type indicates a directional coupler including a protruding part 11d configured such that a protrusion length Pd becomes continuously larger as farther from both ends of the protruding part and closer to the center of the protruding part (see FIG. 17). Specific examples of the protrusion length Pd, which becomes larger continuously, encompass a protrusion length Pd represented by a linear function or quadric as a function of a distance from both ends of the protruding part. Furthermore, examples of the directional coupler 1 of the slope taper type encompass a directional coupler in which in a case where a wide wall is seen from above, a narrow wall of the protruding part 11d is configured to have a part of an arc of a circle or of an ellipse.

At the protruding part 11d of the directional coupler 1 illustrated in FIG. 17, the protrusion length Pd is represented by a linear function, i.e., a function of a distance from both ends of the protruding part 11*d*. Accordingly, the directional coupler 1 is a specific example of the directional coupler of the slope taper type.

The directional coupler 1 of the step taper type indicates a directional coupler 1 configured such that a protrusion length Pd increases discretely as farther from both ends of a protruding part 11*d* and closer to the center of the protruding part 11*d* (see FIG. 18). In other words, the directional coupler 1 of the step taper type is a directional coupler 1 configured such that a protrusion length Pd increases stepwisely as farther from both ends of a protruding part 11*d* and closer to the center of the protruding part 11*d*. The number of step(s) at which the protrusion length Pd increases discretely in the protruding part 11*d* can be one or more.

FIG. 18 illustrates a case where the number of steps, at which the protrusion length Pd increases discretely in the protruding part 11*d* of the directional coupler 1, is two.

The directional coupler 1 of the slope step taper type indicates a directional coupler 1 configured such that a protruding part 11*d* is constituted by a slope part 11*d*1 and a step part 11*d*2 (see FIG. 19). The slope part 11*d*1 is a part which includes an end of the protruding part 11*d* and whose protrusion length Pd increases continuously as farther from the end of the protruding part 11*d* and closer to the center of the protruding part 11*d*. The step part 11*d*2 is a part which includes the center of the protruding part 11*d* and whose protrusion length Pd increases discretely as farther from the end of the protruding part 11*d* and closer to the center of the protruding part 11*d*. The number of step(s) at which the protrusion length Pd increases discretely in the step part 11*d*2 can be one or more.

In the directional coupler 1 illustrated in FIG. 19, the protrusion length Pd in the slope part 11*d*1 is represented by a linear function as a function of a distance from both ends of the protruding part 11*d*. Furthermore, in the directional coupler 1 illustrated in FIG. 19, the number of step at which the protrusion length Pd increases discretely in the step part 11*d*2 is one.

(Relation in Size Between Length L of Protruding Part and Width W of Opening)

In the directional couplers 1 in accordance with respective Variations 13 through 15, the relation in size between a length Ld of the protruding part 11*d* and the width W of the opening 131 is not particularly limited. That is, the relation in size between the length Ld and the width W can be any one of Ld>W, Ld=W, and Ld<W. The directional coupler 1, illustrated in FIG. 17, employs Ld>W as the relation in size between the length Ld and the width W.

(a) of FIG. 20 shows a result of calculation of a frequency dependency of S parameters with use of one example of the directional coupler 1 in accordance with Variation 13. (a) of FIG. 20 is a graph showing a frequency dependency of S parameters of this directional coupler 1. This directional coupler 1 includes the protruding parts 11*d* and 12*d* of the slope taper type, as illustrated in FIG. 17. In this directional coupler 1, the protrusion length Pd is 100 μm, and the length Ld is 15 mm. This directional coupler 1 has otherwise the same configuration as the directional coupler 1 in accordance with the Examples.

As is clear from (a) of FIG. 20, S(1,1) and S(1,4) were each less than −13 dB in a frequency band of not less than 65.0 GHz and not more than 86.8 GHz. That is, (a) of FIG. 20 shows that the directional coupler 1 in accordance with Variation 13 can cut return losses in a frequency band of not less than 65.0 GHz and not more than 86.8 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 82.9 GHz and not more than 85.2 GHz, a difference between S(1,2) and S(1,3) was less than 1.0 dB. That is, in consideration of the frequency band in which the return loss can be cut, it is found that the directional coupler 1 in accordance with Variation 13 operates more preferably as a directional coupler having a coupling degree of 3 dB in a frequency band of not less than 82.9 GHz and not more than 85.2 GHz.

As described above, the directional coupler 1 in accordance with Embodiment 1 can further include the protruding parts 11*d* and 12*d* as other protruding sections.

With reference to (b) of FIG. 20, the following description will discuss another example of the directional coupler in accordance with Variation 13 of the present invention. (b) of FIG. 20 is a graph showing a frequency dependency of S parameters of the directional coupler 1. The directional coupler 1 was obtained by changing the protrusion length Pd of the directional coupler 1 illustrated in (a) of FIG. 20 from 100 μm to 300 μm.

As is clear from (b) of FIG. 20, S(1,1) and S(1,4) were each less than −13 dB in a frequency band of not less than 71.3 GHz and not more than 90.0 GHz. That is, it is found that the directional coupler 1 in accordance with the present Variation can cut return losses in a frequency band of not less than 71.3 GHz and not more than 90.0 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 78.9 GHz and not more than 90.0 GHz, a difference between S(1,2) and S(1,3) was less than 1.0 dB. That is, in consideration of the frequency band in which the return loss can be cut, it is found that the directional coupler 1 in accordance with Variation 13 operates more preferably as a directional coupler having a coupling degree of 3 dB in a frequency band of not less than 78.9 GHz and not more than 90.0 GHz.

FIG. 21 shows a result of calculation of a frequency dependency of S parameters with use of the directional coupler 1 in accordance with Variation 15. FIG. 21 is a graph showing a frequency dependency of S parameters of the directional coupler 1 in accordance with Variation 15. The directional coupler 1 in accordance with Variation 15 employs the protrusion length Pd of 300 μm and the length Ld of 15 mm. The protrusion length Pd (300 μm) consists of a protrusion length in the slope part 11*d*1 being 100 μm and a protrusion length in the step part 11*d*2 being 200 μm.

As is clear from FIG. 21, S(1,1) and S(1,4) were each less than −13 dB in a frequency band of not less than 71.3 GHz and not more than 90.0 GHz. That is, it is found that the directional coupler 1 in accordance with Variation 15 can cut return losses in a frequency band of not less than 71.3 GHz and not more than 90.0 GHz including a frequency band of not less than 100% and not more than 105% of 78.5 GHz which is a target frequency, i.e. a frequency band of not less than 78.5 GHz and not more than 82.4 GHz.

Furthermore, in a frequency band of not less than 78.9 GHz and not more than 90.0 GHz, a difference between S(1,2) and S(1,3) was less than 1.0 dB. That is, in consideration of the frequency band in which the return loss can be cut, it is found that the directional coupler 1 in accordance with Variation 15 operates more preferably as a directional coupler having a coupling degree of 3 dB in a frequency band of not less than 78.9 GHz and not more than 90.0 GHz.

As described above, the directional couplers 1 in accordance with Variations 13 through 15 each further include the protruding parts 11d and 12d as other protruding sections.

[Configuration Example] With reference to FIG. 22, the following description will discuss a configuration example of the directional coupler 1 in accordance with Embodiment 1. FIG. 22 is a top view illustrating a configuration of the directional coupler 1 in accordance with the present configuration example.

Each of the first waveguide 11 and the second waveguide 12 included in the directional coupler 1 in accordance with the present configuration example is produced with use of a post-wall waveguide technique.

As described above, the first waveguide 11 and the second waveguide 12 are provided plane-symmetrically with respect to the first narrow wall 13. Accordingly, here, only the first waveguide 11 will be described, and the second waveguide 12 will not be described.

Specifically, the first waveguide 11 includes (i) the dielectric substrate 10, (ii) a pair of conductor plates (not illustrated in FIG. 22) provided on respective both sides of the dielectric substrate 10, (iii) a post wall obtained by providing a conductor post 112$i$, which penetrates the dielectric substrate 10, in a wall manner, and (iv) a post wall obtained by providing a conductor post 13$i$ in a wall manner.

In the present configuration example, the conductor post 13$i$ consists of a pair of conductor posts.

The directional coupler 1 is configured such that when seen from above, conductor posts constituting the conductor post 112$i$ are provided in such a manner that a line joining respective centers of the conductor posts corresponds to the shape of the narrow wall 112 illustrated in FIG. 1, and conductor posts constituting the conductor post 13$i$ are provided in such a manner that a line joining respective centers of the conductor posts corresponds to the shape of the narrow wall 13 illustrated in FIG. 1.

Accordingly, the pair of conductor plates provided on respective both sides of the dielectric substrate 10 function as the wide walls 111$a$ and 111$b$, respectively. The post wall obtained by providing the conductor post 13$i$ in a wall manner functions as the narrow wall 13 which is the first narrow wall. The post wall obtained by providing the conductor post 112$i$ in a wall manner functions as the narrow wall 112 which is the second narrow wall.

The pair of protruding sections 11$a$ are each formed by providing one or more conductor posts in such a manner that the one or more conductor posts are adjacent to the conductor post 13$i$ constituting the narrow wall 13. In a case where there are a plurality of conductor posts constituting each of the pair of protruding sections 11$a$, the plurality of conductor posts are aligned near the narrow wall 13 so as to be along a direction from the narrow wall 13 toward the narrow wall 112.

In the directional coupler 1 in accordance with the present configuration example, the protrusion length Pa of each of the pair of protruding sections 11$a$ is a distance between (1) a line joining respective centers of conductor posts constituting the conductor post 13$i$, i.e. a center line of the narrow wall 13 and (2) an end of the conductor post constituting each of the pair of protruding sections 11$a$. A width Wa of each of the pair of protruding sections 11$a$ is a diameter of the conductor post constituting each of the pair of protruding sections 11$a$.

The protruding section 11$b$ is configured similarly with the pair of protruding sections 11$a$. Accordingly, in the directional coupler 1 in accordance with the present configuration example, the protrusion length Pb is a distance between (1) a line joining respective centers of conductor posts constituting the conductor post 112$i$, i.e. a center line of the narrow wall 112 and (2) an end of the conductor post constituting the protruding section 11$b$. A width Wb of the protruding section 11$b$ is a diameter of the conductor post constituting the protruding section 11$b$.

In the present configuration example, the conductor posts 112$i$ and 122$i$, the conductor post 13$i$, the conductor posts constituting the pair of protruding sections 11$a$, and conductor posts constituting the protruding section 11$b$ each have a diameter of 100 μm. A distance between the conductor post 112$i$ and a conductor post 112$i$+1 which are adjacent to each other, a distance between the conductor post 122$i$ and a conductor post 122$i$+1 which are adjacent to each other, and a distance between the conductor post 13$i$ and a conductor post 13$i$+1 which are adjacent to each other are each 200 μm. However, these diameters and distances are not limited to those in the present configuration example, and may be determined appropriately depending on a target frequency.

In the present configuration example, the directional coupler 1 can be produced with use of a post-wall waveguide technique. Accordingly, it is possible to integrate, on a single substrate, the directional coupler 1 with other waveguide, band-pass filter etc. which are produced with use of the post-wall waveguide technique.

The directional coupler 1 is an H plane-coupled directional coupler in which the first waveguide 11 and the second waveguide 12 are coupled with each other via the opening 131 provided in the narrow wall 13 shared by the first waveguide 11 and the second waveguide 12. The H plane-coupled directional coupler 1 is preferable as a directional coupler produced with use of the post-wall waveguide technique, because the H plane-coupled directional coupler 1 can be produced with use of a single dielectric substrate 10.

Embodiment 2

With reference to FIG. 23, the following description will discuss a diplexer in accordance with Embodiment 2 of the present invention. (a) and (b) of FIG. 23 are block diagrams each showing a configuration of a diplexer 5 in accordance with Embodiment 2.

As illustrated in (a) of FIG. 23, the diplexer 5 includes two directional couplers 1 in accordance with Embodiment 1, a first filter 51, and a second filter 52.

In Embodiment 2, two directional couplers 1 are referred to as respective directional couplers 1$a$ (first directional coupler) and 1$b$ (second directional coupler) so as to be distinguished from each other. Furthermore, four ports of the directional coupler 1$a$ are referred to as respective first through fourth ports P1$a$ through P4$a$, and four ports of the directional coupler 1$b$ are referred to as first through fourth ports P1$b$ through P4$b$ so as to be distinguished from each other.

Embodiment 2 employs, as the first and second filters 51 and 52, respective band-pass filters (BPF). Hereinafter, the first filter 51 is referred to as a BPF 51 and the second filter 52 is referred to as a BPF 52. The BPFs 51 and 52 transmit only high-frequency signals in a predetermined frequency band, and reflect high-frequency signals in other frequency bands than the predetermined frequency band.

The second port P2$a$ of the directional coupler 1$a$ is connected with the first port P1$b$ of the directional coupler 1$b$, via the BPF 51. The third port P3$a$ of the directional coupler 1a is connected with the fourth port P4b of the directional coupler 1b via the BPF 52.

The BPFs 51 and 52 are configured so as to (i) transmit a high-frequency signal received by an antenna 63 and (ii) reflect a high-frequency signal received from a transmission circuit 61.

The following description will discuss what function is realized by the diplexer 5 configured as above. As illustrated in FIG. (a) of 23, the first port P1a of the directional coupler 1a is connected with the antenna 63, the fourth port P4a of the directional coupler 1a is connected with the transmission circuit 61 (Tx), the second port P2b of the directional coupler 1b is grounded via a terminal resistor 64, and the third port P3b of the directional coupler 1b is connected with a reception circuit 62 (Rx).

There are two paths from the first port P1a connected with the antenna 63 to the third port P3b connected with the reception circuit 62. A first path extends from the first port P1a to the third port P3b, via the second port P2a, the BPF 51, and the first port P1b. A second path extends from the first port P1a to the third port P3b, via the third port P3a, the BPF 52, and the fourth port P4b.

The diplexer 5 configured as above allows a high-frequency signal, which is received by the antenna 63 and is then input to the first port P1a, to arrive at the reception circuit 62.

Similarly, there are two paths from the fourth port P4a connected with the transmission circuit 61 to the first port P1a connected with the antenna 63. A first path is a path in which a high-frequency signal is reflected at an interface between the third port P3a and the BPF 52 and then arrives at the first port P1a. A second path is a path in which a high-frequency signal is reflected at an interface between the second port P2a and the BPF 51 and then arrives at the first port P1a.

The diplexer 5 configured as above allows a high-frequency signal, which is input to the fourth port P4a from the transmission circuit 61, to arrive at the antenna 63.

As described above, the diplexer 5 allows (i) a high-frequency signal having entered the first port P1a connected with the antenna 63 to exit from the third port P3b connected with the reception circuit 62 and (ii) a high-frequency signal having entered the fourth port P4a connected with the transmission circuit 61 to exit from the first port P1a connected with the antenna 63.

As described in the configuration example, the diplexer 5 is preferably prepared with use of the post-wall waveguide technique. The preparation of the diplexer 5 with use of the post-wall waveguide technique allows the directional couplers 1a and 1b and the BPFs 51 and 52 to be integrated on a single dielectric substrate. This allows (i) a reduction in cost for producing the diplexer 5 and (ii) an integration of the diplexer 5.

Furthermore, the diplexer 5 may be configured such that the reception circuit 62 is connected with the fourth port P4a of the directional coupler 1a and the transmission circuit 61 is connected with the third port P3b of the directional coupler 1b as illustrated in (b) of FIG. 23. In this case, the BPFs 51 and 52 may be configured so as to (i) reflect a high-frequency signal received by the antenna 63 and (ii) transmit a high-frequency signal received from the transmission circuit 61. The diplexer 5 illustrated in (b) of FIG. 23 has a function similar to the diplexer 5 illustrated in (a) of FIG. 23.

SUMMARY

A directional coupler of the present invention is a directional coupler, comprising a first rectangular waveguide and a second rectangular waveguide, the first rectangular waveguide and the second rectangular waveguide sharing a first narrow wall having an opening, and the first rectangular waveguide and the second rectangular waveguide including respective second narrow walls each facing the first narrow wall, each of the first rectangular waveguide and the second rectangular waveguide further including: a pair of first protruding sections which are provided, symmetrically with respect to the opening, at the first narrow wall or the second narrow wall, so as to (i) be on an incident side of the opening and on an exit side of the opening, respectively, and (ii) protrude from one of the first and second narrow walls toward the other; and a second protruding section which protrudes from the second narrow wall toward the opening.

In a case where a high-frequency signal with a specific frequency band whose lower limit is a target frequency which is a target operating frequency in design (e.g. frequency band whose lower limit is a target frequency and whose upper limit is 105% of the target frequency) is caused to enter one end of the first rectangular waveguide of the directional coupler configured as above, both of S(1,1) and S(1,4) in the frequency band are smaller than those in a conventional directional coupler. That is, since the directional coupler of the present invention includes a pair of first protruding sections which are provided symmetrically with respect to the opening such that one of the pair of first protruding sections is provided closer to an input-side than the opening is and the other is provided closer to an emission-side than the opening is and a second protruding section which protrudes from the second narrow wall toward the opening, the directional coupler of the present invention can reduce a return loss at the frequency band.

It is preferable to arrange the directional coupler in accordance with one aspect of the present invention such that a distance between the pair of first protruding sections in the first rectangular waveguide is identical to a distance between the pair of first protruding sections in the second rectangular waveguide.

With the directional coupler configured as above, it is possible to cut return losses in a specific frequency band whose lower limit is a target frequency, as compared with a conventional directional coupler.

It is preferable to arrange the directional coupler in accordance with one aspect of the present invention such that the distance between the pair of first protruding sections is not less than 120.8% and not more than 197.7% of a guide wavelength in a case where a high-frequency signal, having a target operating frequency in design, is guided in the first rectangular waveguide and the second rectangular waveguide.

With the directional coupler configured as above, it is possible to cut return losses in a specific frequency band whose lower limit is a target frequency, as compared with a conventional directional coupler.

It is preferable to arrange the directional coupler in accordance with one aspect of the present invention such that a protrusion length by which the pair of first protruding sections protrude from the one of the first narrow wall and the second narrow wall toward the other is not more than 13.5% of the guide wavelength.

With the directional coupler configured as above, it is possible to cut return losses in a specific frequency band whose lower limit is a target frequency, as compared with a conventional directional coupler.

It is preferable to arrange the directional coupler in accordance with one aspect of the present invention such that the second protruding section is a protruding part of the second narrow wall which protruding part protrudes toward the first narrow wall, and in the protruding part, a protrusion length by which the second narrow wall protrudes toward the first narrow wall is larger at a center of the protruding part than at both ends of the protruding part in a direction in which the first rectangular waveguide and the second rectangular waveguide extend.

With the arrangement, it is possible to further cut return losses in a specific frequency band whose lower limit is a target frequency, as compared with a conventional directional coupler.

The directional coupler in accordance with one aspect of the present invention may be arranged such that the protrusion length increases continuously as farther from the both ends of the protruding part and closer to the center of the protruding part.

The directional coupler in accordance with one aspect of the present invention may be arranged such that the protrusion length increases discretely as farther from the both ends of the protruding part and closer to the center of the protruding part.

The directional coupler in accordance with one aspect of the present invention may be arranged such that the protruding part includes: a slope part which includes an end of the protruding part in a direction in which the first rectangular waveguide and the second rectangular waveguide extend and whose protrusion length increases continuously as farther from the end of the protruding part and closer to the center of the protruding part; and a step part which includes the center of the protruding part and whose protrusion length increases discretely as farther from the end of the protruding part and closer to the center of the protruding part.

With the arrangement, it is possible to further cut return losses in a specific frequency band whose lower limit is a target frequency, as compared with a conventional directional coupler.

It is preferable to arrange the directional coupler in accordance with one aspect of the present invention such that each of the first rectangular waveguide and the second rectangular waveguide has wide walls which are a pair of conductor plates provided on respective both sides of a dielectric substrate, and the first narrow wall shared by the first rectangular waveguide and the second rectangular waveguide and the respective second narrow walls of the first rectangular waveguide and the second rectangular waveguide are each made of conductor posts penetrating the dielectric substrate.

The directional coupler configured as above can be produced with use of a post-wall waveguide technique. Accordingly, production of such a directional coupler is easier than production of a directional coupler with use of metal waveguide tubes. This allows the directional coupler to be produced with a lower cost.

It is preferable to arrange the directional coupler in accordance with one aspect of the present invention such that the pair of first protruding sections and the second protruding section are each made of conductor posts via which the wide walls of the first rectangular waveguide or the wide walls of the second rectangular waveguide are electrically conductive.

With the arrangement, the pair of first protruding sections and the second protruding section can be produced easily. Besides, the pair of first protruding sections and the second protruding section can be realized with lighter weights than a case where a pair of protruding sections and other section are formed by a conductive wall.

It is preferable to arrange a diplexer in accordance with one aspect of the present invention so as to comprise: a first directional coupler and a second directional coupler each of which is a directional coupler in accordance with any one of the aspects of the present invention; a first band-pass filter provided between (i) a first rectangular waveguide of the first directional coupler and (ii) a first rectangular waveguide of the second directional coupler; and a second band-pass filter provided between (a) a second rectangular waveguide of the first directional coupler and (b) a second rectangular waveguide of the second directional coupler.

With the arrangement, the diplexer yields an effect similar to that of the directional coupler in accordance with any one of the aspects of the present invention.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is usable for a directional coupler including two rectangular waveguides. Furthermore, the present invention is usable for a diplexer including such directional couplers.

REFERENCE SIGNS LIST

1 Directional coupler
11 First waveguide (first rectangular waveguide)
11$a$ Pair of protruding sections (pair of first protruding sections)
111$a$, 111$b$ Wide wall
11$b$ Other protruding section (second protruding section)
112 Narrow wall (second narrow wall)
12 Second waveguide (second rectangular waveguide)
12$a$ Pair of protruding sections (pair of first protruding sections)
121$a$, 121$b$ Wide wall
12$b$ Other protruding section (second protruding section)
122 Narrow wall (second narrow wall)
13 Narrow wall (first narrow wall)
131 Opening
11$c$, 12$c$ First part
11$d$, 12$d$ Protruding sector (other protruding section)
11$d$1, 12$d$1 Slope part
11$d$2, 12$d$2 Step part
11$e$, 12$e$ Second part
5 Diplexer
51, 52 BPF (band-pass filter)
P1, P1$a$, P1$b$ First port
P2, P2$a$, P2$b$ Second port
P3, P3$a$, P3$b$ Third port
P4, P4$a$, P4$b$ Fourth port

The invention claimed is:

1. A directional coupler, comprising a first rectangular waveguide and a second rectangular waveguide, the first rectangular waveguide and the second rectangular waveguide sharing a first narrow wall having an opening, and the first rectangular waveguide and the second rectangular waveguide including respective second narrow walls each facing the first narrow wall, each of the first rectangular waveguide and the second rectangular waveguide further including:

a pair of first protruding sections which are provided, symmetrically with respect to the opening, at the first narrow wall or the second narrow wall, so as to (i) be on an incident side of the opening and on an exit side of the opening, respectively, and (ii) protrude from one of the first and second narrow walls toward the other; and a second protruding section which protrudes from the second narrow wall toward the opening.

2. The directional coupler as set forth in claim 1, wherein a distance between the pair of first protruding sections in the first rectangular waveguide is identical to a distance between the pair of first protruding sections in the second rectangular waveguide.

3. The directional coupler as set forth in claim 1, wherein the distance between the pair of first protruding sections is not less than 120.8% and not more than 197.7% of a guide wavelength, in a case where a high-frequency signal, having a target operating frequency in design, is guided in the first rectangular waveguide and the second rectangular waveguide.

4. The directional coupler as set forth in claim 3, wherein a protrusion length by which the pair of first protruding sections protrude from the one of the first narrow wall and the second narrow wall toward the other is not more than 13.5% of the guide wavelength.

5. The directional coupler as set forth in claim 1, wherein the second protruding section is a protruding part of the second narrow wall which protruding part protrudes toward the first narrow wall, and in the protruding part, a protrusion length by which the second narrow wall protrudes toward the first narrow wall is larger at a center of the protruding part than at both ends of the protruding part in a direction in which the first rectangular waveguide and the second rectangular waveguide extend.

6. The directional coupler as set forth in claim 5, wherein the protrusion length increases continuously as farther from the both ends of the protruding part and closer to the center of the protruding part.

7. The directional coupler as set forth in claim 5, wherein the protrusion length increases discretely as farther from the both ends of the protruding part and closer to the center of the protruding part.

8. The directional coupler as set forth in claim 5, wherein the protruding part includes:

a slope part which includes an end of the protruding part in a direction in which the first rectangular waveguide and the second rectangular waveguide extend and whose protrusion length increases continuously as farther from the end of the protruding part and closer to the center of the protruding part; and a step part which includes the center of the protruding part and whose protrusion length increases discretely as farther from the end of the protruding part and closer to the center of the protruding part.

9. The directional coupler as set forth in claim 1, wherein each of the first rectangular waveguide and the second rectangular waveguide has wide walls which are a pair of conductor plates provided on respective both sides of a dielectric substrate, and the first narrow wall shared by the first rectangular waveguide and the second rectangular waveguide and the respective second narrow walls of the first rectangular waveguide and the second rectangular waveguide are each made of conductor posts penetrating the dielectric substrate.

10. The directional coupler as set forth in claim 1, wherein the pair of first protruding sections and the second protruding section are each made of conductor posts via which the wide walls of the first rectangular waveguide or the wide walls of the second rectangular waveguide are electrically conductive.

11. A diplexer, comprising:

a first directional coupler and a second directional coupler each of which is a directional coupler as set forth in claim 1;

a first band-pass filter provided between (i) a first rectangular waveguide of the first directional coupler and (ii) a first rectangular waveguide of the second directional coupler; and a second band-pass filter provided between (a) a second rectangular waveguide of the first directional coupler and (b) a second rectangular waveguide of the second directional coupler.

* * * * *